United States Patent
Chimene et al.

(10) Patent No.: US 10,310,891 B2
(45) Date of Patent: Jun. 4, 2019

(54) HAND-OFF SCHEDULING

(71) Applicant: Apple Inc., Cupertino, CA (US)

(72) Inventors: Daniel A. Chimene, San Francisco, CA (US); Daniel A. Steffen, San Francisco, CA (US); James M Magee, Orlando, FL (US); Russell A. Blaine, San Carlos, CA (US); Shantonu Sen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/871,837

(22) Filed: Sep. 30, 2015

(65) Prior Publication Data

US 2016/0357600 A1 Dec. 8, 2016

Related U.S. Application Data

(60) Provisional application No. 62/171,974, filed on Jun. 5, 2015.

(51) Int. Cl.
*G06F 9/48* (2006.01)
*G06F 9/50* (2006.01)
*G06F 9/46* (2006.01)

(52) U.S. Cl.
CPC .......... *G06F 9/4818* (2013.01); *G06F 9/5011* (2013.01)

(58) Field of Classification Search
None
See application file for complete search history.

(56) References Cited

U.S. PATENT DOCUMENTS

| | | | |
|---|---|---|---|
| 6,587,955 B1 * | 7/2003 | Foote | G06F 9/52 713/400 |
| 7,752,621 B2 | 7/2010 | Kush | |
| 7,844,973 B1 | 11/2010 | Dice | |
| 8,161,481 B2 | 4/2012 | May | |

(Continued)

*Primary Examiner* — Eric C Wai
(74) *Attorney, Agent, or Firm* — Womble Bond Dickinson (US) LLP

(57) ABSTRACT

Disclosed herein are systems, methods, and computer-readable media directed to scheduling threads in a multi-processing environment that can resolve a priority inversion. Each thread has a scheduling state and a context. A scheduling state can include attributes such as a processing priority, classification (background, fixed priority, realtime), a quantum, scheduler decay, and a list of threads that may be waiting on the thread to make progress. A thread context can include registers, stack, other variables, and one or more mutex flags. A first thread can hold a resource with a mutex, the first thread having a low priority. A second thread having a scheduling state with a high priority can be waiting on the resource and may be blocked behind the mutex held by the first process. A scheduler can execute the context of the lower priority thread using the scheduler state of the second, higher priority thread. More than one thread can be waiting on the resource held by the first thread. A "pusher list" of threads that are waiting on the first thread can be associated with the first thread. The scheduler can use the pusher list to identify threads that need the first thread to make progress until the first thread releases the resource and mutex. Then, the scheduler can use the pusher list to identify threads that are now runnable and make immediate use of the resource.

25 Claims, 19 Drawing Sheets

(56) References Cited

U.S. PATENT DOCUMENTS

| | | |
|---|---|---|
| 8,479,207 B2 | 7/2013 | Plondke |
| 8,640,129 B2 | 1/2014 | Cismas et al. |
| 8,954,968 B1* | 2/2015 | Pohl .................... G06F 11/3409 |
| | | 718/100 |
| 9,772,959 B2 | 9/2017 | Blaine et al. |
| 2007/0074222 A1* | 3/2007 | Kunze .................... G06F 9/526 |
| | | 718/107 |
| 2014/0189693 A1 | 7/2014 | Trumbull et al. |

* cited by examiner

100 ⟶

110 ⟶
Scheduler State of Thread

| | Attribute | Example Values |
|---|---|---|
| 115→ | Priority | 80 (high), 30 (mid), 4 (low) |
| 120→ | Quantum | 10 ms, 15 ms |
| 125→ | CPU Usage | 35 ms |
| 130→ | Classification | Real Time, Fixed Priority, Background |
| 135→ | Scheduling decay | 79 |
| 140→ | Pusher list | T1, T2... |

150 ⟶
Thread Context

| | Attribute | Example Values |
|---|---|---|
| 155→ | Critical section | Yes/No or mutex value |
| 160→ | Registers | AX, BX, CX, DX, CS, DS, SS, IP, et al. |
| 165→ | Stack | Pointers and data structure |
| 170→ | Local variables | Integer, real, boolean, long, string |

*FIG. 1*

HAND-OFF SCHEDULING

RELATED APPLICATIONS

This application claims priority under 35 U.S.C. § 119(e) of U.S. Patent Application No. 62/171,974, filed Jun. 5, 2015, and entitled "HAND-OFF SCHEDULING," which is incorporated herein by reference to the extent that it is consistent with this disclosure.

TECHNICAL FIELD

This disclosure relates to the scheduling and processing of threads in a processing system. More specifically, the disclosure relates to scheduling of threads when a priority inversion has occurred and after the priority inversion has been resolved.

BACKGROUND

A scheduler in an operating system of a processing device schedules a plurality of processing threads ("threads") for processing by one or more processors ("cores") in the processing device. A thread has a scheduling state and a thread processing context. The scheduling state can include a variety of attributes such as a processing priority for the thread, a quantum of time that a processor will work on the thread before scheduling another thread for the processor, and other attributes. A thread context for can include storage corresponding to one or more processor registers. The data in the storage can represent the state of the corresponding processor registers when the thread was last processed by a processor. Thread context can further include other thread-specific variables and information.

As is known in the art, during a critical section of a first thread, the first thread may hold a mutual exclusion flag ("mutex") on a resource, such as a write-lock on a record of a database. For example, the critical section may include the completion of a write operation of the record to a database. A second thread may include a read operation on the database, e.g., to read the record from the database. The first thread holds the mutex on the database record so that the first process can complete writing the database record before another thread can read the record. The scheduler will block the second thread, and put the second thread on a wait queue, while the second thread is waiting for the first thread to release the mutex on the resource (e.g., record). While on the wait queue, the second thread is removed from consideration by the scheduler as a thread that may be selected for processing. A "priority inversion" occurs when the first thread that holds the mutex on the resource has as lower scheduling state priority than the second thread that is waiting on the release of the mutex so that the second thread may perform processing using the resource (e.g., record). A priority inversion reduces overall processing performance because the scheduler will select higher priority threads for processing before the processing the lower priority thread holding the mutex, but a higher priority thread is blocked, waiting on the release of the mutex held by the lower priority thread.

There are at least two methods to resolve a priority inversion in the prior art. First, do nothing and simply wait for the lower priority thread to release the mutex. This solution is undesirable, particularly when the blocked higher priority thread that is waiting on the mutex has a very high priority relative to the thread holding the mutex. The second method to resolve a priority inversion involves active steps by the scheduler.

Schedulers in the prior art detect the priority inversion, dequeue the first thread from the run queue, and assign the first thread the higher priority of the second thread that is blocked, waiting on the first thread to release the mutex. The scheduler can then reschedule the first thread using the higher priority of the second thread. The second thread is then put on a wait queue. In some systems of the prior art, the first thread may never be restored to its previous, lower priority. After the first thread has been scheduled in the run queue, and the first thread has been processed to the point that the first thread finishes its critical section and releases the mutex on the resource, then the second thread is woken up from the wait queue and the second thread can be scheduled on the run queue. In some systems of the prior art, after resolving the priority inversion, the first thread and the second thread will both have the same processing priority. Further, some schedulers use many variables to determine a final effective scheduler priority for threads, and may adjust those variables on a frequent basis. The scheduler will have to then reflect those changes onto the borrowed priorities of resource-holding threads.

SUMMARY

Disclosed herein are embodiments of systems and methods for efficiently scheduling threads in a processing device. The threads can have a scheduling state and a thread context. A scheduling state can include such attributes as a processing priority, a thread classification, a quantum of time that the thread may have for processing on a processor before being preempted in a multi-tasking preemptive operation system, a scheduling decay that reduces the priority of a thread when the thread uses too much processor time, and a "pusher list." A pusher list can include a list of threads that are related to the thread holding the pusher list. In an embodiment, the pusher list can include a list of threads that are waiting on a resource held by the thread having the pusher list. A thread's pusher list can also be associated with a mutual exclusion flag ("mutex") that holds the resource upon which the threads in the pusher list are waiting. In an embodiment, the threads on the pusher list waiting on the mutex can be blocked at the point where each thread has attempted to acquire the resource.

In an embodiment, a method for scheduling a thread having a priority inversion is provided. A priority inversion can occur when a first thread having a low priority holds a resource and a second thread having a high priority is waiting on the resource held by the first thread. A method of scheduling a thread can detect that the first thread holds a mutual exclusion flag ("mutex") on the resource while the first thread is using the resource. When the first thread is done using the resource, the first thread can release the mutex. The first thread can have a first scheduling state that can have a first processing priority. In an embodiment, the first thread scheduling state can also indicate a quantum of time for running the thread on a processor of the processing device. The first thread can further include a first thread context that includes a state of one or more registers associated with the first thread. The first thread context can further include storage for thread-specific variables and other information. A second thread can have a second scheduling state that includes a second processing priority. In an embodiment, the second thread scheduling state can also indicate a quantum of time for processing the second thread on the processor. The second thread can further include a second thread context that includes a state of one or more registers associated with the second thread. The second processing context can further include storage for thread-specific variables and other information. The second scheduling priority can be higher than the first scheduling priority. If the second thread is blocked, waiting on a resource that is currently owned by the first thread, the second thread can hand off its second scheduling state to the first thread. The scheduler can then schedule the context of the first thread to execute on a processor using the scheduling state of the second thread. In an embodiment, while the first thread is scheduled in a run queue for processing, the second thread can also be stored in the run queue, in association with the first thread, even though the second thread is waiting on release of the resource held by the first thread.

In an embodiment, the first scheduling state can further include a reference to a list of one or more threads that are waiting on the resource held by the first thread ("pusher list"). The threads on the pusher list can be ordered by highest priority first, and descending in order of priority. In an embodiment, the context of the threads on the pusher list of the first scheduling state can also be stored in a wait queue.

In an embodiment, the first thread can finish with the resource and release the mutex holding the resource. Then the scheduler can examine the pusher list of threads in the scheduling state of the first thread, and determine whether one of the threads on the pusher list should be scheduled to run next. The thread from the pusher list that is scheduled to run next can then be removed from the pusher list of the first thread. In an embodiment, the context of the threads referenced in the pusher list can be put on the wait queue.

BRIEF DESCRIPTION OF THE DRAWINGS

FIG. 1 illustrates a table of example fields of a thread scheduling state and a thread context, according to some embodiments.

DETAILED DESCRIPTION

Figure 2:
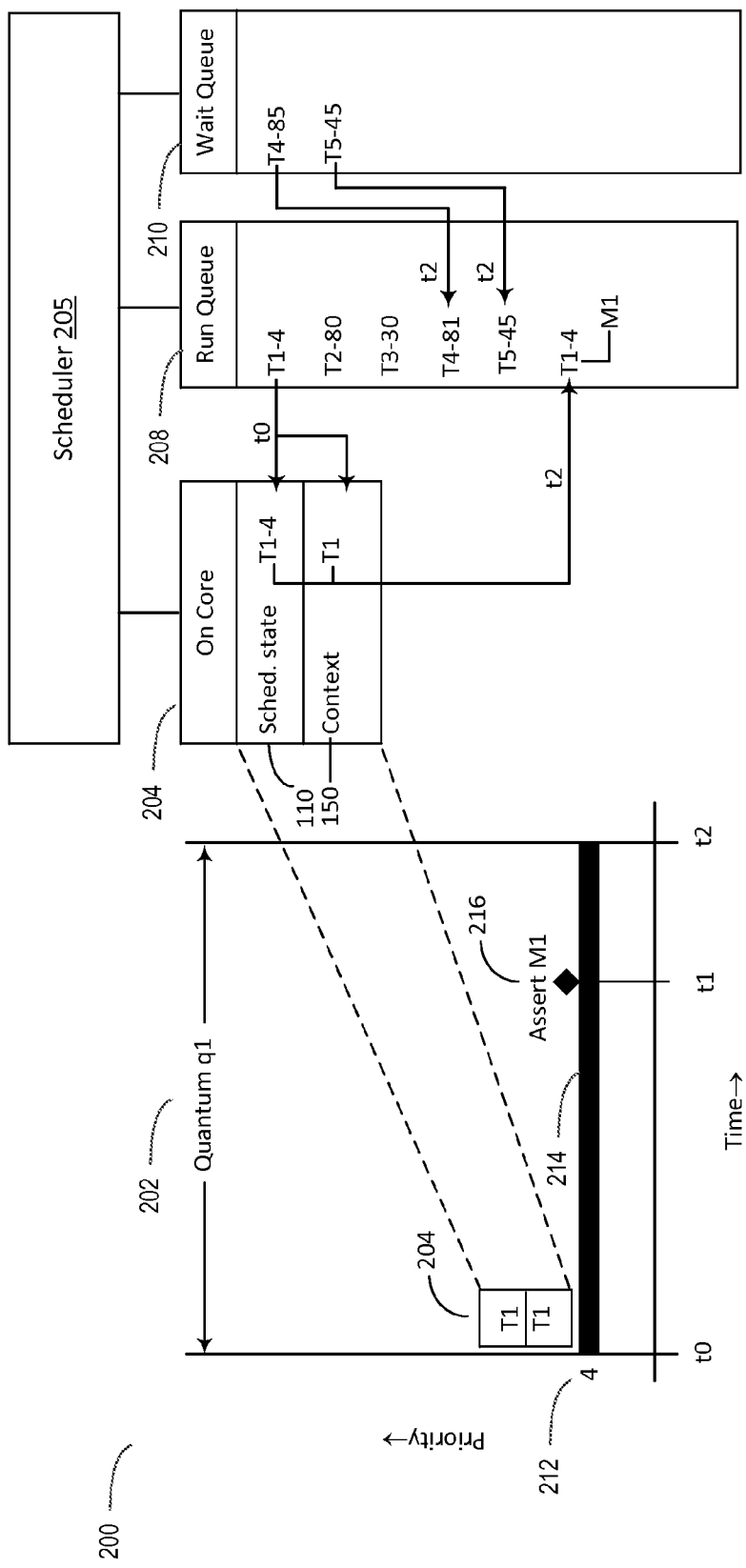
FIGS. 2, 3A, 3B, 4, 5A, 5B, 6A, 6B, 7A, 7B, 8A, and 8B illustrate an example of scheduling a plurality of threads over a series of processing quanta, according to some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for efficient scheduling of threads in a processing system, including scheduling of threads when a priority inversion has occurred, and after the priority inversion has been resolved. The thread scheduling systems and methods described below take advantage of information about the threads, gained during resolution of the priority inversion, to increase the efficiency with which the thread are processed.

An undesirable consequence of the prior art is that after the priority inversion is resolved, the first and second threads will compete for processor time at the same priority level. It would be preferable for the scheduler to give preference to processing the second thread, once the first thread has released the mutex. It would further be preferable for the first thread to be restored to its previous, lower priority level. In addition, if the priority level of the first and second threads (now the same, after resolving the priority inversion) is higher than other important work in the processing device, the other work will not be processed in a timely manner because the first thread has received a higher priority (the second thread's priority) as an undesired consequence of resolving the priority inversion. FIG. 1 illustrates example fields of a thread scheduling state 110 and a thread context 150 of a thread 100. In some embodiments described herein, a thread 100 can be split into two distinct portions: a scheduling state 110 of the thread 100 and a thread context 150. The two portions can be scheduled for execution on a processor, and context-switched, separately. For example, the scheduling state 110 of a first thread T1 may be used to execute the thread context 150 of a second thread T2.

A scheduling state 110 can represent attributes of a thread 100 that a scheduler may use to make a decision as to which thread to schedule next, from among a plurality of threads in a run queue. Attributes of a scheduling state of a thread 100 can include a priority 115, a quantum of processor time 120, an amount of processor usage 125 that the thread 100 has used so far, a classification of the thread 130, a scheduling decay 135, and a pusher list 140. A priority 115 of a thread can be a numeric value, such as 80, or 30 or 4. In an embodiment, a priority 115 can be a designation such as low, medium, high, or expedited. Quantum 120 can represent the amount of time that the thread 100 is allocated for running a processor, such as 10 milliseconds (ms), 15 ms, or other value. A plurality of threads 100 can each have a different quantum 120. CPU usage 125 can indicate a running accumulation of the amount of processor time that a thread 100 has been used during execution on a processor. CPU usage 125 can be used to decay the scheduling priority 135 of a thread 100 and to determine how much processor time to charge a thread for its work. Classification 130 can be real-time, fixed priority, background, or other indicator of the thread type. A thread scheduler may take the classification 130 into account when selecting a thread for execution on a processor. Scheduling decay 135 can represent a reduction in priority of a thread 100 over time. A scheduler may decay the priority of a long-executing thread that has a high, and growing, CPU usage 125.

Scheduling state 110 of thread 100 may also include a pusher list 140. Pusher list 140 can indicate a list of one or more threads 100 that are waiting behind ("pushing") the thread 100 having the pusher list 140 in a priority inversion. For example, a first thread T1 may have acquired a resource R1 during a critical section of thread T1. Thread T1 can assert a mutual exclusion (mutex) flag M1 during the critical section of T1 such that R1 will not be available to any other thread until mutex M1 is released. A second thread T2 may need the resource R1, but cannot have R1 during the critical section of thread T1. Thus, thread T2 can be waiting on ("pushing on") thread T1 to release resource R1 as indicated by mutex flag M1. Second thread T2 can be added to thread T1's pusher list 140. Similarly, a third thread T3 can also require use of resource R1 held by thread T1. Thread T3 can also be added to pusher list 140 of thread T1. In an embodiment, pusher list 140 can be ordered by priority of the threads on the pusher list. In an embodiment, pusher list 140 can be ordered by first-in-first-out order that the threads are added to the pusher list 140. In another embodiment, pusher list 140 can be ordered by first-in-last-out order that the threads are added to pusher list 140.

Thread context 150 can represent the current state of execution of a thread 100. Thread context 150 attributes can include a critical section 155 indicator (mutex flag), registers 160, stack 165, and local variables 170. Critical section 155 can be a Boolean flag, such as 0 or 1, or yes/no. In an embodiment, critical section 155 can be a value of a mutex flag or a pointer to a mutex flag. Registers 160 can be a copy of the registers of a processor that a thread will load into the processor when the thread is scheduled to run on the processor. Registers 160 can also represent the last values of the processor at the time that the thread was taken off the processor by the scheduler. Similarly, stack 165 can represent values that were on a processor stack at the time that the thread was taken off the processor. In an embodiment, stack 165 can represent a local stack structure containing values put on the stack during execution of the thread. Thread context 150 can further include local variables, typed or untyped. Types can include integer, real, Boolean, long, string, array, and the like. Untyped variables can include untyped pointers.

The above-described attributes of scheduling state 110 and thread context 150 are illustrative and not to be construed as limiting. In the description of the following figures, reference is made to scheduling state 110 and thread context 150. For simplicity, only a few of the above-described scheduling state 110 and thread context 150 attributes are discussed. It is understood that scheduling state 110 and thread context 150 can include more, or fewer, attributes that described below without departing from the inventive concepts described herein.

FIGS. 2 through 8B illustrate an example of scheduling a plurality of threads over a series of processing quanta, according to some embodiments. Each of the sequence of figures contains certain common features that will be described once and are understood to have the same meaning within all of the FIGS. 2 through 8B.

FIG. 2 illustrates, in a processing system 200, a first processing quantum $q_1$ of a processor ("core") 204. For simplicity, only one core 204 is shown. It is understood that the concepts described herein can equally be applied to a multi-core processing system 200. For simplicity, the quanta illustrated in FIGS. 2 through 8B all use the same duration: 10 ms. It is understood that each thread can have a different quantum of processing time. Further, the quantum of time for a thread can be changed during processing. In addition, processing of a thread can be pre-empted and cut short before the full quantum allocated to the thread has been utilized.

Example threads T1 through T5 have been given certain attributes, such as a priority value. In the following examples, a low priority value indicates a thread with a low processing priority and a high priority value indicates a thread with a high processing priority. For example, thread T1 can have priority 4 which is a low priority, such as may be used for a background processing task. Another thread, e.g. T2, can have priority 80, such as may be used for real-time processing tasks.

A thread running on core 204 can have a scheduling state 110 and a thread context 150. As described above, with reference to FIG. 1, scheduling state 110 can have many attributes. For simplicity, only the priority of a thread is shown. As also described above, with reference to FIG. 1, thread context 150 can have a plurality of attributes, including registers, stack, local variables, and whether or not the thread is holding a mutual exclusion flag ("mutex") for processing a critical section of the thread. For simplicity, only the mutex flag, if one is present in a thread, is shown.

A processing system 200 can have scheduler 205, run queue 208, and wait queue 210. Run queue 208 can hold the threads that are runnable, from which scheduler 205 can select a thread for processing on core 204. In FIG. 2, at time $t_0$, run queue 208 can contain example threads T1 having priority 4, T2 having priority 80, and T3 having priority 30. Wait queue 210 can hold threads that are not currently runnable. A thread may not be runnable for a wide variety of reasons, one of which is that the thread may be waiting on a resource held by another thread. In FIG. 2, at time $t_0$, wait queue 210 holds example threads T4 having priority 85 and T5 having priority 45.

During each quantum, scheduler 205 can select a thread scheduling state 110 and a thread context 150 for running on core 204. As described herein, the selected scheduling state 110 and thread context 150 can be for different threads. Further, a direct context switch can occur that selects a different scheduling state 110 for running a particular thread context 150, or selects a different thread context 150 for running a particular scheduling state 110. As described further below, in some embodiments, both the particular scheduling state 110 and thread context 150 can be directly context-switched without the scheduler having to make a selection from among all threads within run queue 208. A direct context switch can occur when scheduler 205 directly selects a scheduling state 110, a thread context 150, or both, for running on core 204 from information within the scheduling state 110 that is currently on core 204, the thread context 150 that is currently on core, or a pusher list 140 of a thread that has already been identified by scheduler 205, or a mutex held by a thread that has already been identified by scheduler 205.

Quantum $q_1$ 202 begins at time $t_0$. At time $t_0$, scheduler 205 can select scheduling state 110 of thread T1 and thread context 150 of thread T1 from run queue 208 to execute 214 on core 204. Within quantum $q_1$, thread execution 214 is shown at priority 212 having a value of 4. At time $t_1$, an event 216 occurs. Event 216 can be thread T1 acquiring a resource R1 and asserting a mutex M1 over resource R1. While thread T1 holds resource R1, indicated by mutex M1, another process that requests resource R1 can block at mutex M1.

Quantum $q_1$ ends at time $t_2$. An entry can be added to run queue 208 indicating that thread T1, with priority 4, has asserted mutex M1. At time $t_2$, for the sake of illustration, threads T4 and T5 have been made runnable, and have been moved from wait queue 210 to run queue 208. The specific reasons that threads T4 and T5 have become runnable are not relevant for purposes of illustrating the operation of the scheduler 205.

Figure 3A:
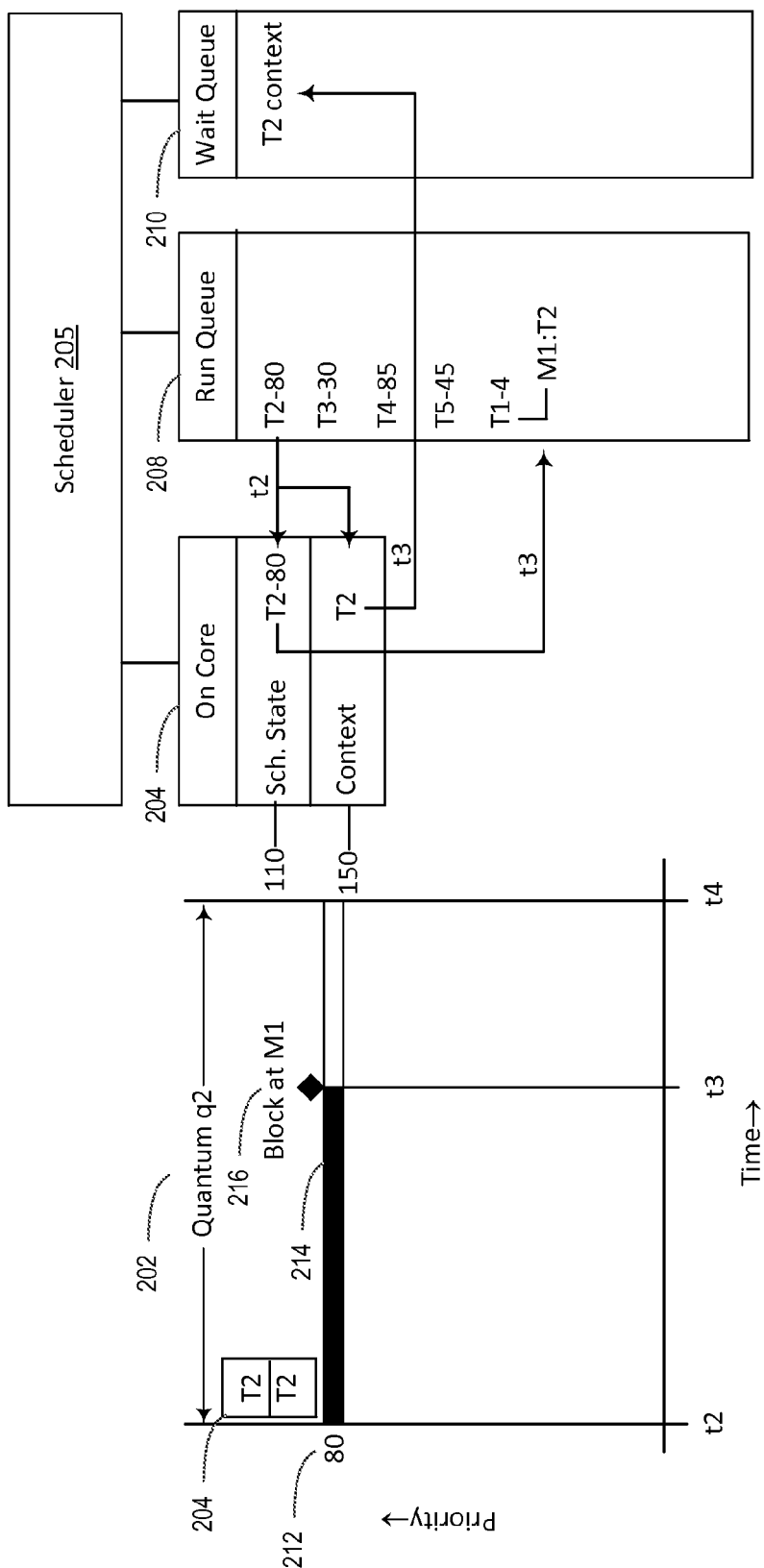

In FIG. 3A, quantum $q_2$ begins at time $t_2$. Scheduler 205 can select thread T2 with priority 80 from run queue 208 for running on core 204. During execution 214 of thread T2, thread T2 can request resource R1 held by mutex M1 that is owned by thread T1. As shown in run queue 208, threads T3 with priority 30, T4 with priority 81, and T5 with priority 47 also may be selected by scheduler 205 for processing before scheduler selects the low priority thread T1 that is blocking high priority thread T2. Thus high priority thread T2 is blocked behind low priority thread T1 in a "priority inversion."

At time $t_3$, when thread T2 blocks at mutex M1, scheduler 205 can move thread context 150 of thread T2 to wait queue 210. Scheduler 205 can then add scheduling state 110 of thread T2 to pusher list 140 of thread T1, thereby associating thread T2 with the thread T1 that is blocking thread T2. If the priority of thread T2 were lower than the priority of T1, schedule 205 could opt to simply block T2, put context 150 of thread T2 on wait queue 210, and make T2 wait until mutex M1 is released and T2 is on core 204.

As shown below in FIG. 3B, thread T2 scheduling state 110 can be used to execute the context 150 of thread T1 to make progress toward releasing resource R1 held by mutex M1. In doing so, thread T2 will be charged for the CPU usage 125 used in pushing thread T1.

Figure 3B:
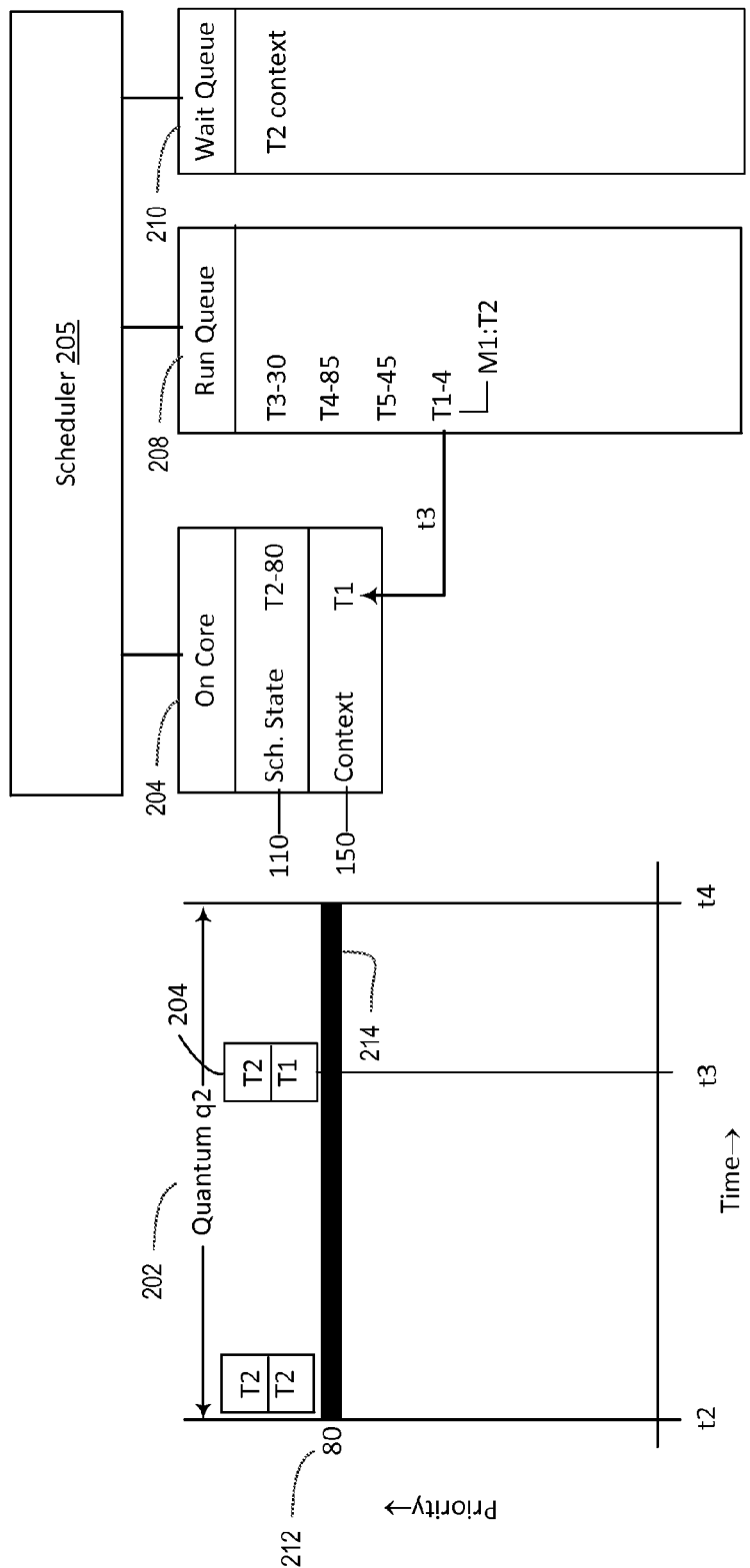

In FIG. 3B, scheduler 205 can detect that thread T2 has blocked at mutex M1. Scheduler 205 can also determine that mutex M1 holds resource R1 that is owned by thread T1. Thread T1 is currently on run queue 208 and scheduler 205 can also determine that thread T2 is listed in pusher list 140 of thread T1. At time $t_3$, scheduler 205 can directly context-switch thread context 150 of thread T1 onto the core 204 and execute 214 context 150 of thread T1 using scheduling state 110 of thread T2. The context switch is direct because scheduler 205 does not need to make a new selection decision of which thread to run from run queue 208. The context 150 of thread T1 can be directly switched onto core 204. Here, scheduling state 110 of thread T2 has priority 80. Thus, core 204 can execute the context 150 of thread T1 temporarily using the scheduling state 110 of thread T2 having priority 80 during the remainder of quantum $q_2$. Thread T2 can be charged for the CPU usage 125 of pushing the context 150 of thread T1. Thus, thread T2 is charged all 10 ms of the 10 ms quantum $q_2$; T2 is charged CPU usage 125 for both for the time that context 150 of thread T2 ran on core 204 and the time that T2 scheduling state 110 ran on core 204 with thread context 150 of T1.

Figure 4:
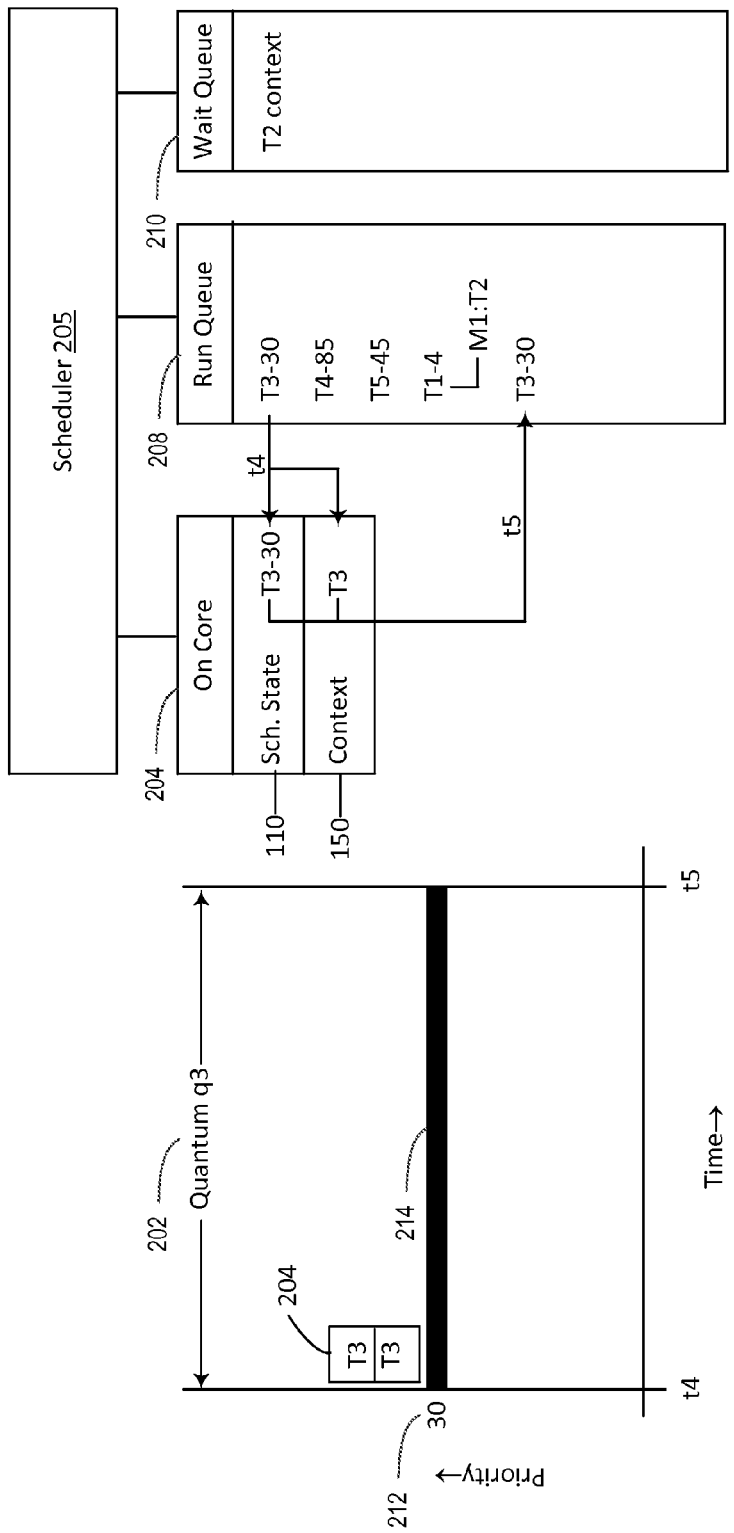

In FIG. 4, scheduler 205 can select the scheduling state 110 and context 150 of thread T3 having priority 30 for executing 214 on core 204. Quantum $q_3$ begins executing thread T3 at time $t_4$ and quantum q3 ends at time $t_5$. At the end of quantum $q_3$, at time $t_5$, assuming that thread T3 has more processing to do, then scheduler 205 can put thread T3 put back on run queue 208 for later selection by scheduler 205.

Figure 5A:
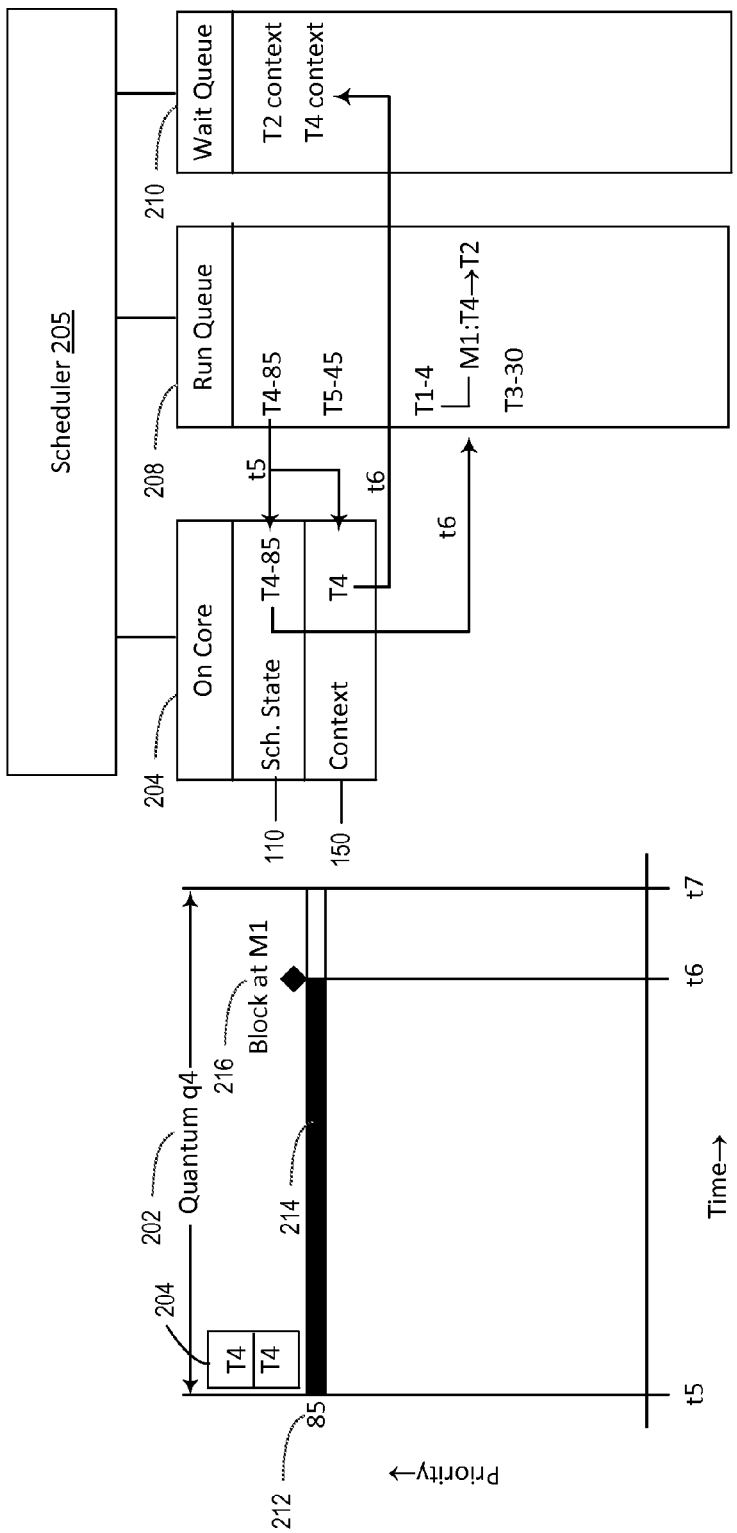

In FIG. 5A, quantum $q_4$ begins at time $t_5$. Scheduler 205 can select thread T4 with priority 85 from run queue 208 for executing 214 on core 204. At time $t_6$, thread T4 may request resource R1 that is currently in use by thread T1 and held by mutex M1. Thread T4 can block at mutex M1, waiting for resource R1. Scheduler 205 can then move the thread context 150 of thread T4 onto wait queue 210. At time $t_6$, scheduler 205 can also add thread T4 to pusher list 140 of thread T1. Pusher list 140 of thread T1 contains a list of threads that are waiting on mutex M1 held by low priority thread T1. Putting thread T4 on pusher list 140 of thread T1 associates thread T4 with thread T1 within run queue 208. In an embodiment, scheduling state 110 and thread context 150 of thread T4 can both be put on wait queue 210, and pusher list 140 of thread T1 can contain a pointer to the entry in wait queue 208 for thread T4.

As shown below in FIG. 5B, thread T4 scheduling state 110 can be used to execute the context 150 of thread T1 to make progress toward releasing resource R1 held by mutex M1 and owned by T1. In doing so, thread T4 will be charged for CPU usage 125 used in pushing thread T1.

Figure 5B:
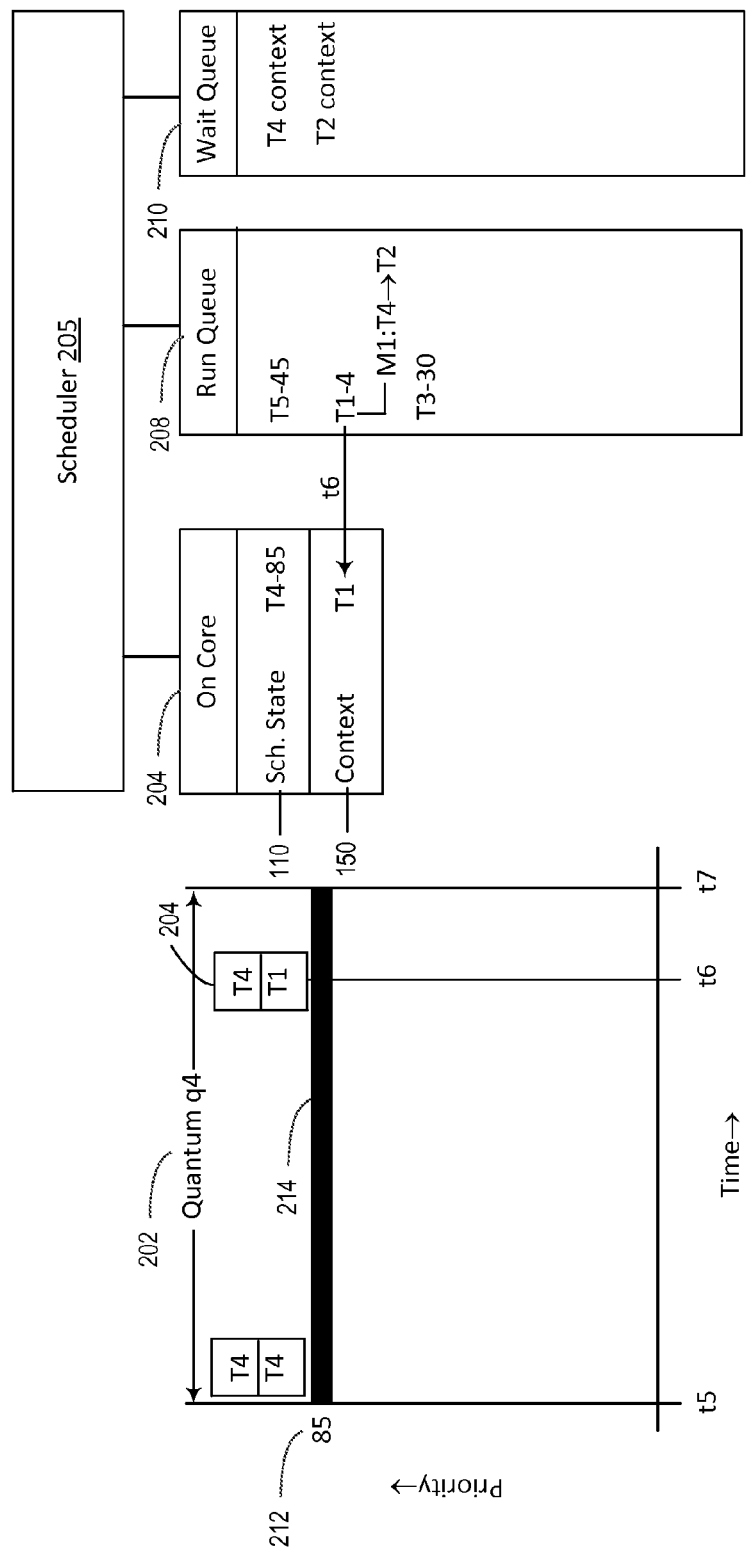

In FIG. 5B, at time $t_6$, scheduler 205 can detect that thread T4 has blocked at mutex M1. Scheduler 205 can also determine that mutex M1 holds a resource that is owned by thread T1. Thread T1 is currently on run queue 208. Scheduler 205 can also determine that thread T4 is listed in pusher list 140 of thread T1. Thread T4 is waiting on thread T1 to finish with resource R1 so that thread T4 can acquire resource R1. Thus, it is beneficial for the progress of thread T4 that thread T1 should run on core 204 and finish with resource R1. At time $t_6$, scheduler 205 can directly context-switch context 150 of thread T1 onto core 204 and execute context 150 of thread T1 using thread the scheduling state 110 of T4. The context switch is direct because scheduler 205 does not need to make a new selection decision of which thread to run from the run queue 208. Scheduling state 110 of thread T4 has priority 85. Core 204 can execute the context 150 of thread T1 using the scheduling state 110 of thread T4 having priority 85. Thread T4 can be charged for the CPU usage 125 of pushing the context 150 of thread T1. Thus, thread T4 is charged all 10 ms of the 10 ms quantum $q_4$, even though thread T4 only used a portion of quantum q4 to make progress on thread context 150 of thread T4.

Figure 6A:
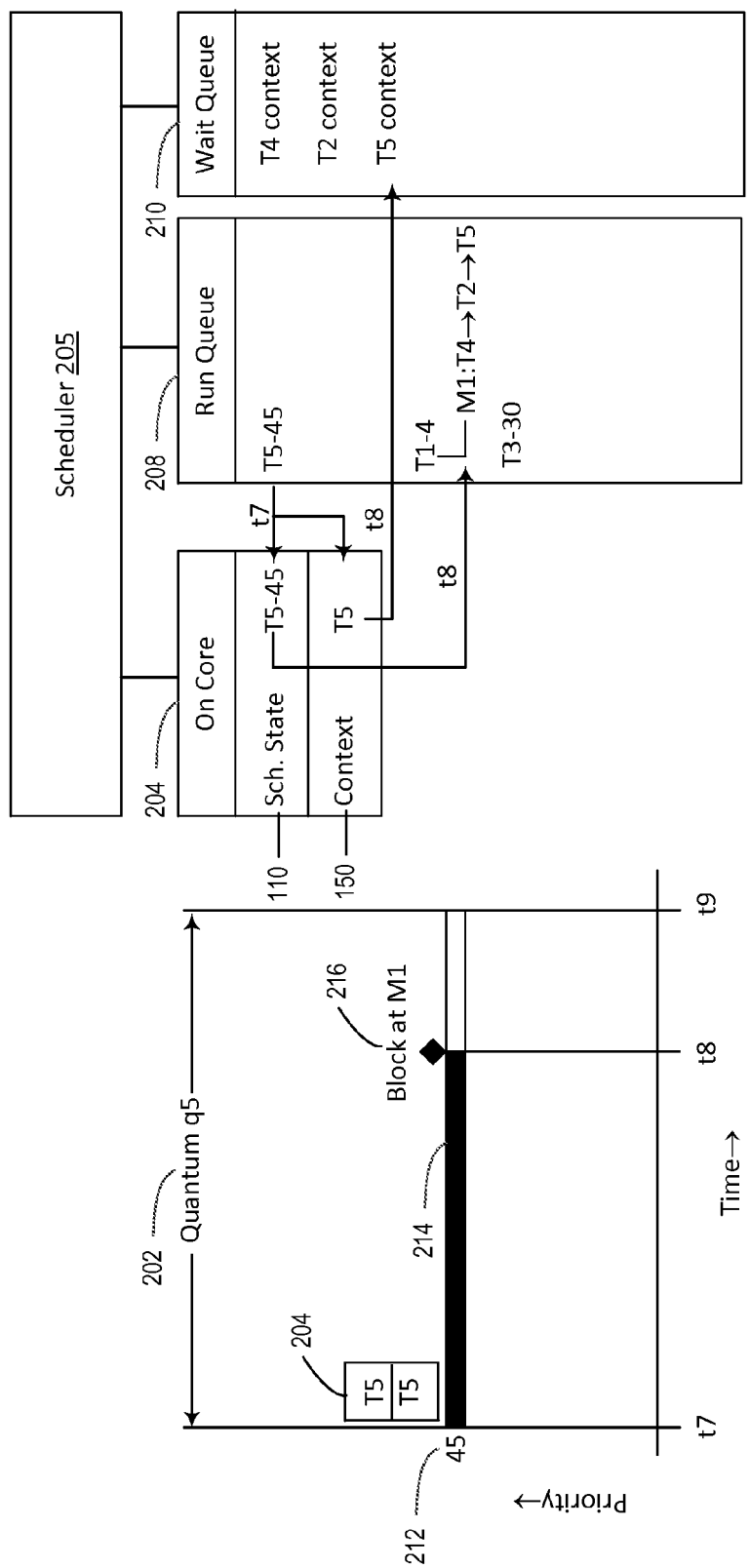

In FIG. 6A, quantum $q_5$ begins at time $t_7$. At time $t_7$, scheduler 205 can evaluate the threads in run queue 208 to determine which thread to schedule next on core 204. Threads in wait queue 210 are not considered by scheduler 205 for running on core 204. Scheduler 205 can select the scheduling state 110 and context 150 of thread T5, having priority 45, from run queue 208 for executing 214 on core 204. Thread T5 can then begin executing 214 on core 204 at time $t_7$.

At time $t_8$, thread T5 may request resource R1 that is in use by thread T1 and held by mutex M1. Thread T5 can then block at mutex M1, waiting for resource R1 to become available. Resource R1 is still in use by thread T1, and held by mutex M1. At time $t_8$, scheduler 205 can then move the thread context 150 of thread T5 onto wait queue 210. Also at time $t_8$, the scheduler can add thread T5 to the pusher list 140 of threads that are waiting on mutex M1 held by thread T1, thereby associating thread T5 with thread T1 within run queue 208. At this point, threads T4, T2, and T5 are all on pusher list 140 of thread T1, waiting for thread T1 to finish with resource R1 and to release mutex M1. The thread context 150 for the threads on pusher list 140 of thread T1 are all on wait queue 210.

As shown below in FIG. 6B, thread T5 scheduling state 110 can be used to execute the context 150 of thread T1 to make progress toward releasing resource R1, which thread T5 is waiting for. Resource R1 is still held by mutex M1 that is owned by thread T1.

Figure 6B:
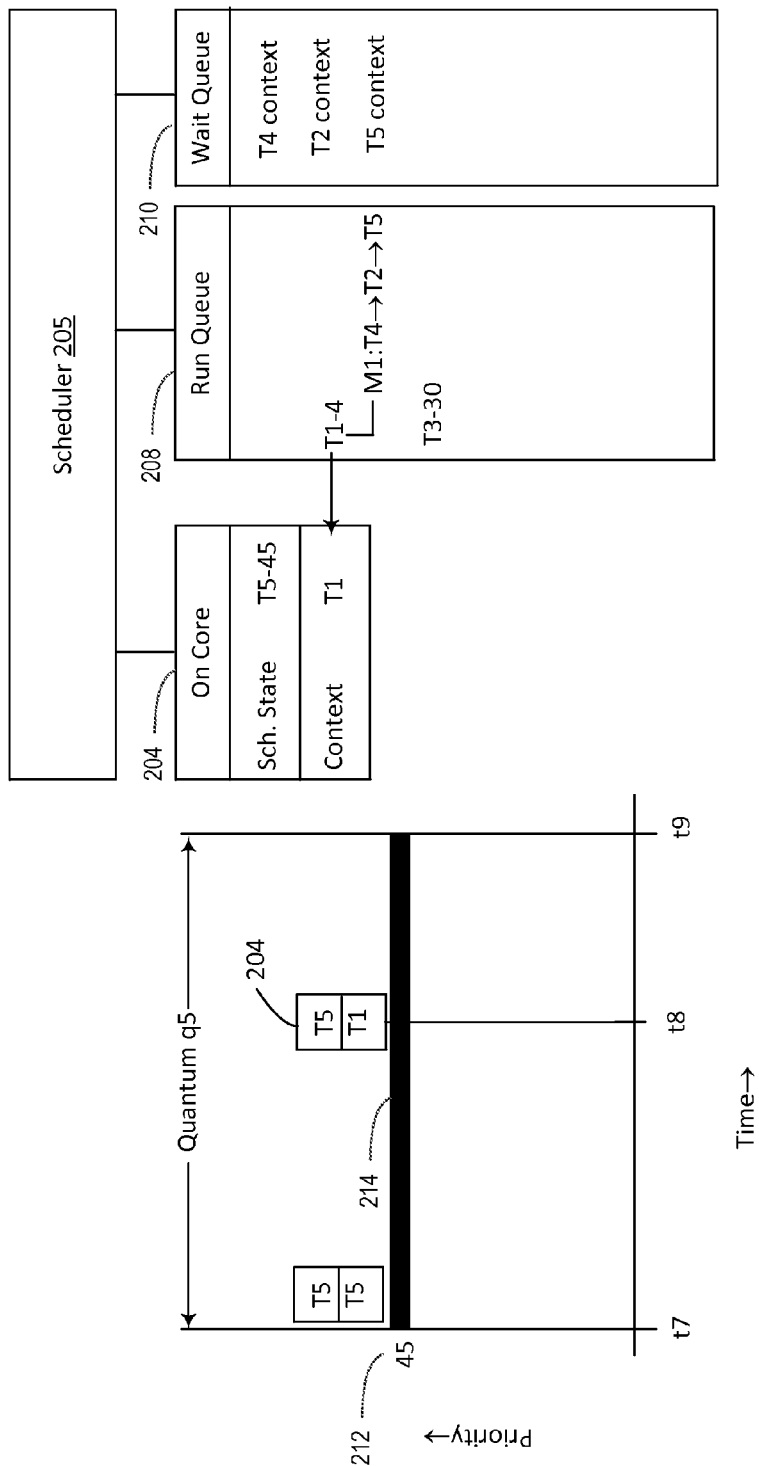

In FIG. 6B, in quantum $q_5$, at time $t_8$, scheduler 205 can detect that thread T5 has blocked at mutex M1. Scheduler 205 can further determine that mutex M1 holds a resource that is owned by thread T1. Thread T1 is currently on run queue 208. Scheduler 205 can also determine that thread T5 is on pusher list 140 of thread T1 behind mutex M1. Thus, thread T5 is waiting on thread T1 to finish with resource R1 so that thread T4 can acquire resource R1. It can be beneficial to the progress of thread T5 that thread T1 runs on core 204 and finishes with resource R1. At time $t_8$, scheduler 205 can directly context-switch the thread context 150 of thread T1 onto core 204 and execute context 150 of thread T1 using the scheduling state 110 of T5. The context switch is direct because scheduler 205 does not need to make a new selection decision of which thread to run from among the available threads on run queue 208. Scheduling state 110 of thread T5 has priority 45. Thus, core 204 can execute the context 150 of thread T1 using the scheduling state 110 of thread T5 having priority 45. Thread T5 can be charged for the CPU usage 125 of pushing the context 150 of thread T1. Thus, thread T5 is charged all 10 ms of the 10 ms quantum $q_5$, even though thread T5 only used a portion of quantum $q_5$ to make progress on thread context 150 of thread T5.

Figure 7A:
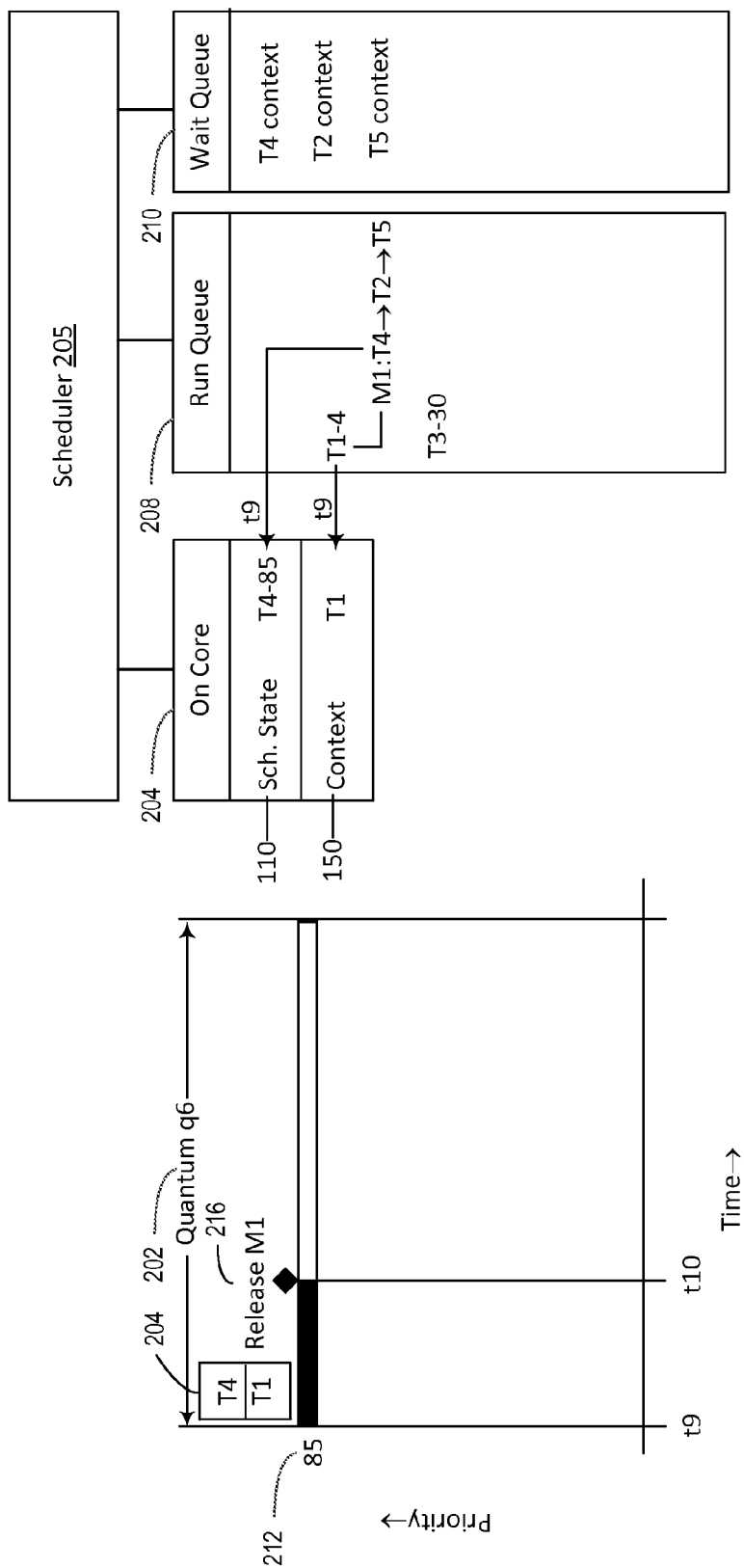

In FIG. 7A, in quantum $q_6$, at time $t_9$, scheduler 205 can determine which thread to select for executing on core 204 from among the threads on run queue 208. Threads T1 and T3 are currently on run queue 208. Schedule 205 can determined that thread T1 has a pusher list 140 containing threads that are waiting for thread T1 to finish using resource R1, held by mutex M1. Further, scheduler 205 can also determine that one or more processes on pusher list 140 of thread T1 have a priority that is higher priority than both thread T1 and T3. Thus, scheduler 205 can select a scheduling state 110 from the threads on pusher list 140 of thread T1. Pusher list 140 of thread T1 currently contains scheduling state 110 for threads T4, T2, and T5 having priorities 85, 80, and 45 respectively. Scheduler 205 may select the thread having the scheduling state 110 with the highest priority, here thread T4 with priority 85. Scheduler 205 can select thread context 150 of thread T1 for running on core 204 with scheduling state 110 of thread T4. Thread context 150 of thread T1 can be selected for running because other, higher priority, tasks are waiting on pusher list 140 of thread T1 to use resource R1 held by mutex M1.

Scheduling state 110 of thread T4 and context 150 of thread T1 can run from time $t_9$ until thread context 150 of thread T1 finishes with resource R1 and releases mutex M1 at time $t_{10}$. When thread T1 releases mutex M1, indicating that resource R1 is available, the threads listed on pusher list 140 of thread T1 are no longer waiting on ("pushing") thread T1 and the priority inversion has been resolved. However, the threads on pusher list 140 of thread T1 are all waiting to immediately acquire resource R1 as soon as resource R1 is available. Further, the threads on pusher list 140 of thread T1 may also be higher priority than T1 itself. Thus it may be preferable to execute one of the threads on pusher list 140 of thread T1 than to allow context 150 of thread T1 to continue processing in quantum $q_6$. For simplicity, the following description will continue to use the scheduling state 110 attribute "pusher list 140" to describe processing of threads that now remain on the pusher list, even though the priority inversion has been resolved with the release of mutex M1 and the threads on pusher list 140 of thread T1 are no longer "pushing" T1.

Pusher list 140 of thread T1 has properties that are valuable to scheduler 205 for making scheduling decisions. Because the threads on pusher list 140 of thread T1 each blocked on mutex M1 while attempting to acquire resource R1, the threads on pusher list 140 of thread T1 are all guaranteed to attempt to acquire resource R1 as soon as any one of them is put on core 204 for execution. The threads on pusher list 140 of thread T1 may also be prioritized. If the pusher list 140 of thread T1 was generated in order of priority, then scheduler 205 can immediately determine the highest (and lowest) priority thread on pusher list 140 of thread T1 that is waiting on resource R1. If the pusher list 140 was generated in the order in which the threads attempted to acquire resource R1, then pusher list 140 contains a list of threads waiting to acquire resource R1 and the threads on pusher list 140 are in the order in which each of the threads attempted to acquire resource R1. Either of the above thread orders of pusher list 140 of thread T1 can be valuable to scheduler 205 in selecting a next thread to put on core 204.

Since the threads on pusher list 140 of thread 1 are no longer waiting on ("pushing") thread 1, then scheduler 205 can process the pusher list 140 of thread T1 in at least two ways.

First, for each thread on pusher list 140 of thread T1, scheduler 205 can wake up the corresponding thread context 150 on wait queue 210, and generate an entry in run queue 208 for each woken up thread, including the thread scheduling state 110. Those threads would be available to scheduler 205 to select for executing on core 204.

Figure 7B:
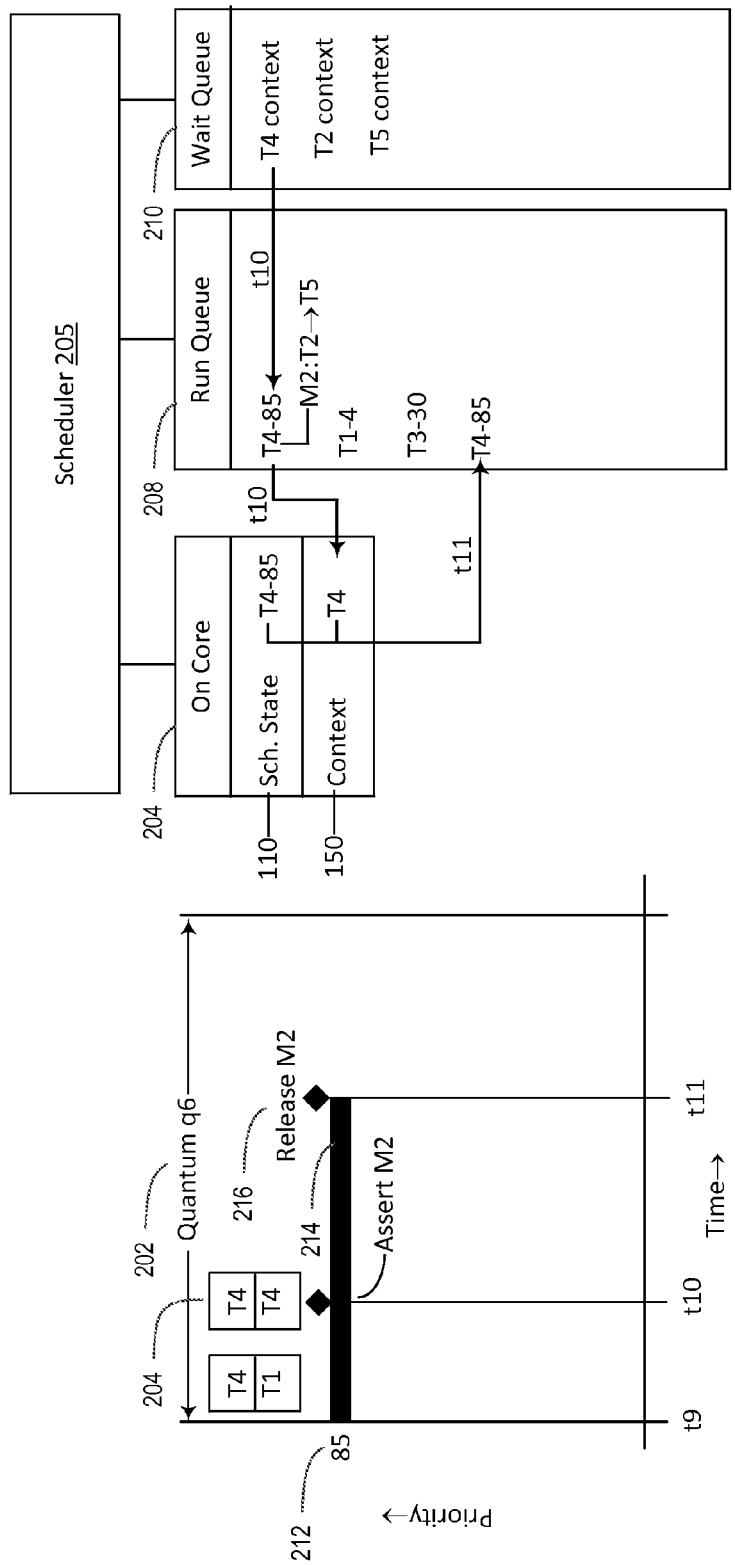

Second, scheduler 205 can utilize the above-listed properties of the pusher list 140 of thread T1 to efficiently process the threads from the pusher list 140. In FIG. 7B, the properties of the pusher list 140 of thread T1 are utilized to efficiently process the threads in the pusher list 140.

In FIG. 7B, at time $t_{10}$, scheduler 205 can obtain scheduling state 110 of thread T4 from pusher list 140 of thread T1 by removing scheduling state 110 of thread T4 from the pusher list 140. After removing thread T4 from pusher list 140 of thread T1, the remainder of pusher list 140 of thread T1 would be threads T2 and T5. Scheduler 205 can also wake up the context 150 of thread T4 and put context 150 of thread T4 on run queue 208 along with scheduling state 110 of thread T4. Context 150 of thread T4 can then be executed 214 on core 204 using scheduling state 110 of thread T4.

Since thread T4 was previously blocked at mutex M1 while attempting to acquire resource R1, when thread T4 executes 214 on core 204, thread T4 will immediately acquire resource R1 and assert a new mutex M2 held by thread T4. Since thread T1 no longer holds resource R1, scheduler 205 can transfer or link the remainder of pusher list 140 of thread T1 onto thread T4. Thus, beginning at time $t_{10}$, thread T4 can become runnable, thread T4 can acquire resource R1 and hold R1 with mutex M2, and threads T2 and T5 can be added to pusher list 140 of thread T4. Pusher list 140 of thread T4 represents the list of threads that are waiting on resource R1, currently held by thread T4.

In FIG. 7B, in quantum $q_6$, at time $t_{11}$, thread T4 may finish using resource R1 and release mutex M2. Resource R1 can be used by one of the threads on pusher list 140 of thread T4. Scheduler 205 can take thread T4 off of core 204 and return thread T4 to the run queue 208 for future scheduling to complete other work of thread T4.

At quantum q6, time $t_{11}$, thread T4 has finished with resource R1 and has released mutex M2. Thus, the threads on pusher list 140 of thread T4 are no longer blocked behind mutex M2 and can be selected by scheduler 205 for execution. In an embodiment, scheduler 205 could allow thread T4 to finish processing within quantum $q_6$. However, doing so would allow an opportunity for another thread to acquire resource R1. Scheduler 205 knows that pusher list 140 of thread T4 contains a list of threads that have already blocked, waiting on resource R1. Thus, in another embodiment, scheduler 205 can preempt core 204 at time $t_{11}$, and select a thread for execution on core 204 from the pusher list 204 of thread T4. The following description of FIG. 8A describes preempting thread T4 at time $t_{11}$ to select another thread for execution on core 204.

Figure 8A:
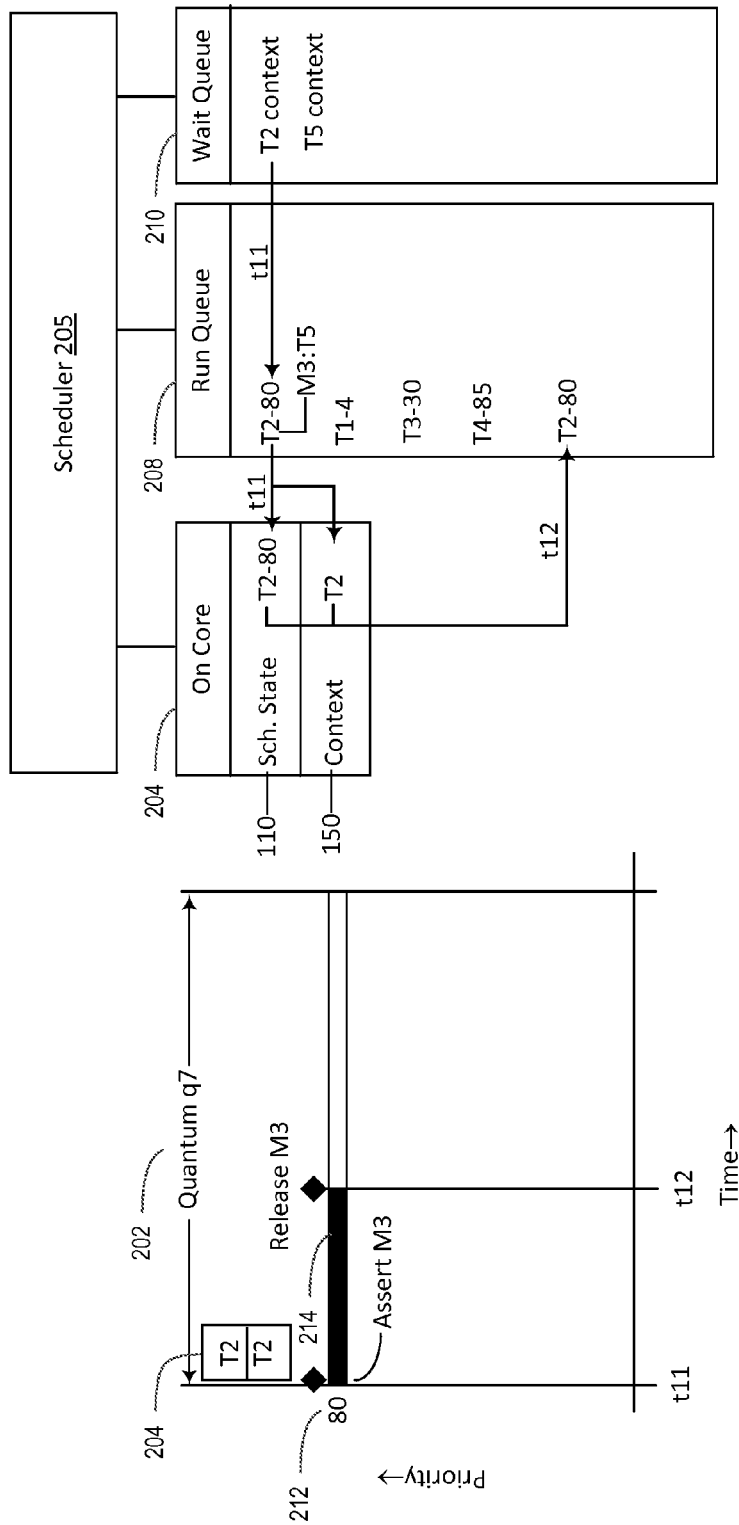

In FIG. 8A, quantum $q_7$, at time $t_{11}$, scheduler 205 can select thread T2 from pusher list 140 of thread T4. Scheduler can wake up context 150 of thread T2 from wait queue 210. Scheduler 205 can extract scheduling state 110 from pusher list 140 of thread T4. Scheduler 205 can put scheduling state 110 and context 150 of thread T2 on run queue 208 for executing on core 204 at time $t_{11}$. Previously, thread T2 was blocked at mutex M2, waiting on resource R1. Now resource R1 is now available. When thread T2 begins execution 214 at time $t_{11}$, thread T2 can immediately acquire resource R1 and assert mutex M3 to hold resource R1. The last remaining pusher list 140 entry for thread T2 is thread T5. Scheduler 205 can link or transfer thread T5 to pusher list 140 of thread T2 behind mutex M3.

In quantum $q_7$, at time $t_{12}$, thread T2 may finish utilizing resource R1 and release mutex M3. In an embodiment, scheduler 205 can allow thread T2 to continue processing and finish quantum $q_7$, after releasing mutex M3. However, scheduler 205 knows that thread T5 was waiting on resource R1 at mutex M3, which is now released. Allowing thread T2 to continue processing to the end of quantum $q_7$ may allow another thread to acquire resource R1. In another embodiment, scheduler 205 can preempt core 204 at time $t_{12}$, and select a thread for execution on core 204 from the pusher list 204 of thread T2. Doing so would ensure that the thread selected from pusher list 140 will acquire resource R1. In yet another embodiment, scheduler 205 could preempt core 204 execution of thread T2 when thread T2 releases mutex M3, and scheduler 205 could select a new thread for execution 214 during quantum $q_7$ from among the threads on the run queue 208. The following description of FIG. 8B describes preempting thread T2 at time $t_{11}$ to select the last remaining thread on pusher list 140 of thread T2 for execution on core 204 during quantum $q_7$.

Figure 8B:
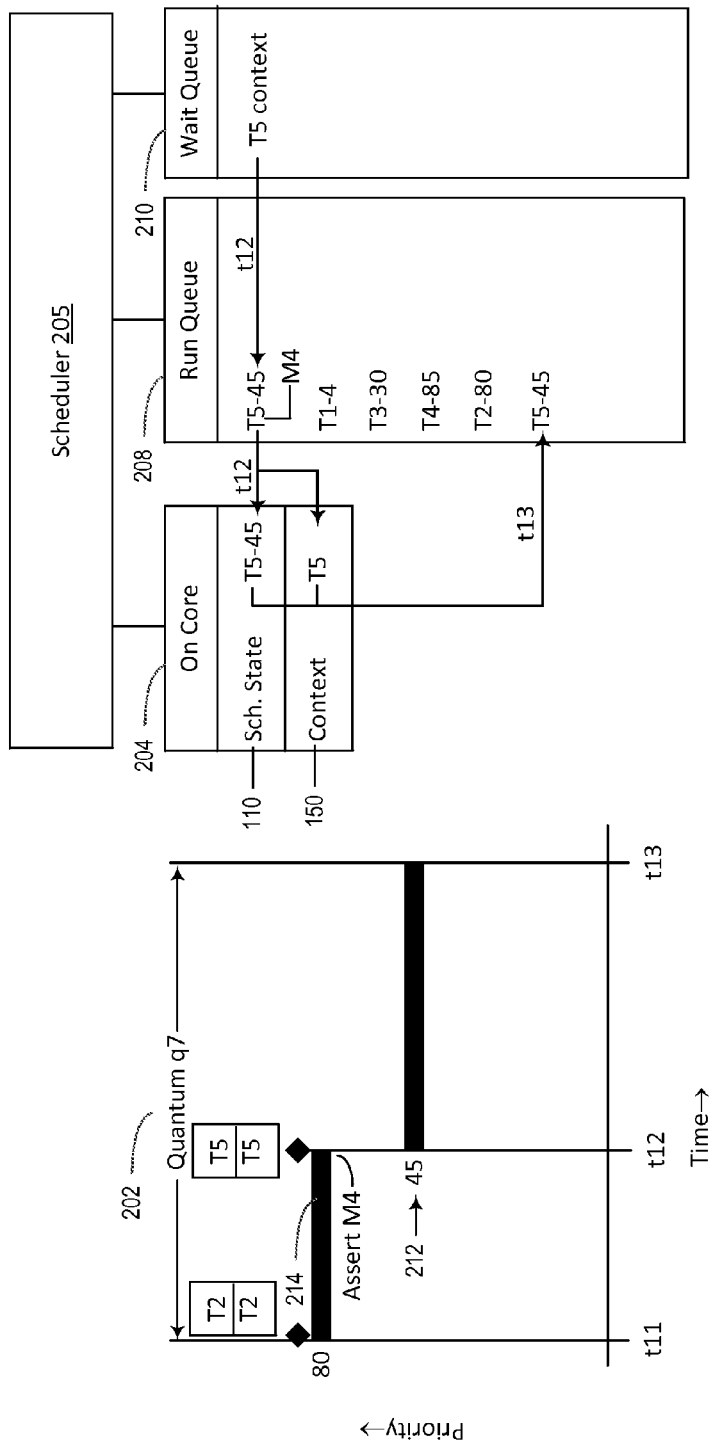

In FIG. 8B, quantum $q_7$, at time $t_{12}$, after thread T2 has released mutex M3 and resource R1, scheduler 205 can preempt thread T2 and put thread T2 back on run queue 208 for future processing of any further work thread T2 may have. Scheduler 205 can obtain scheduling state 110 for thread T5 from pusher list 140 of thread T2. Scheduler 205 can also wake up context 150 on thread T5 on wait queue 210. Scheduler 205 can then combine scheduling state 110 and context 150 of thread T5 on run queue 208 and select thread T5 for execution 214 on core 204 at priority 45.

At time $t_{13}$, quantum $q_7$ ends and thread T5 can be returned to run queue 208 for selection by scheduler 205 to perform further work. Thread T5 still holds mutex M4 for resource R1, but there are currently no threads waiting for resource R1, either in run queue 208 or on a pusher list 140 of a thread in run queue 208.

At the end of quantum $q_7$, wait queue 210 is empty and run queue 208 contains threads T1 through T5. Based on the above-described illustrative example of processing of threads, pusher lists 140 for all threads are currently empty. The priority inversion that was described in FIG. 3A, wherein a high priority thread T2 was blocked behind low priority thread T1, has been resolved. In the process of resolving the priority inversion, a plurality of threads that were each blocking, waiting on a same resource R1, have been processed in a manner that processed the critical sections of these threads back-to-back, thereby unblocking a plurality of blocked processes as quickly as possible.

Figure 9A:
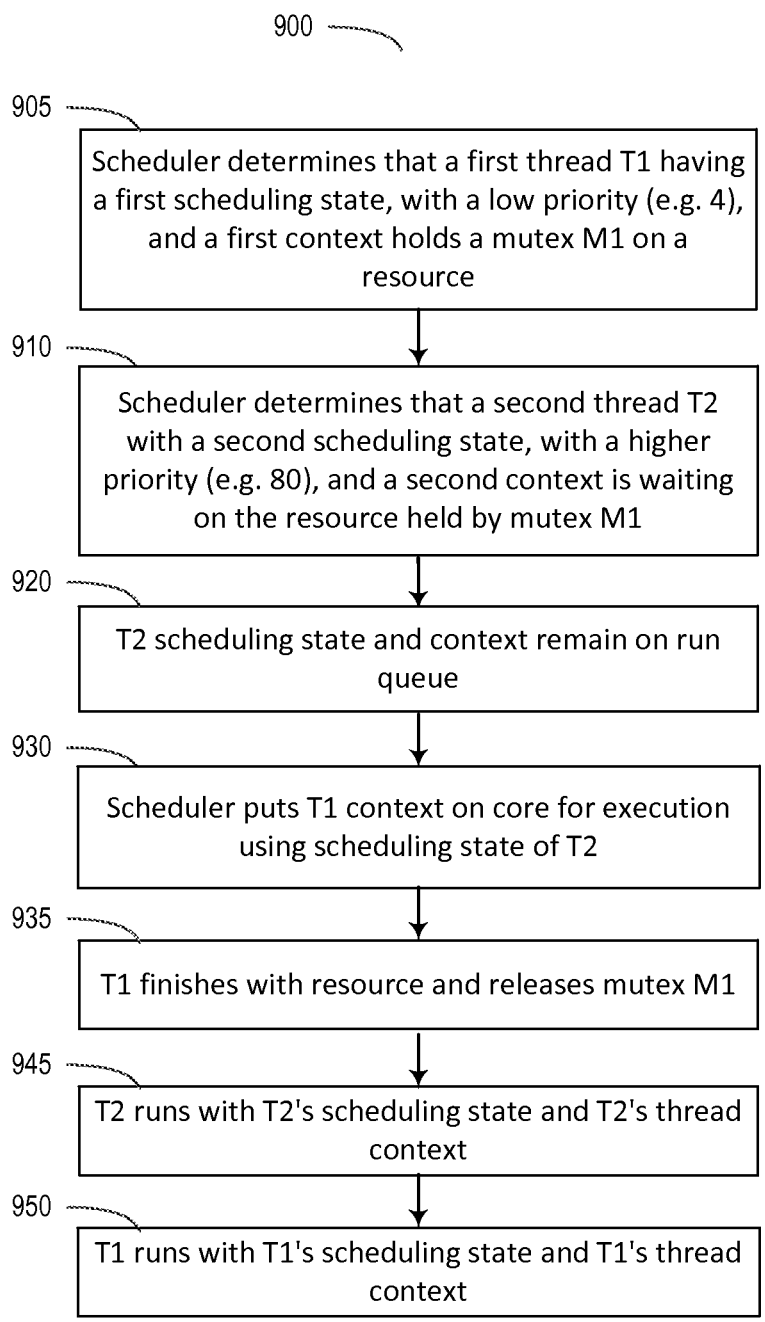
FIGS. 9A and 9B each illustrate, in block diagram form, a flow chart of a method of processing a priority inversion according to some embodiment.

FIG. 9A illustrates, in block diagram form, a flow chart of a method 900 of processing a priority inversion according to some embodiments. In embodiments according to FIG. 9A, scheduling state 110 of thread T2 and context 150 of thread T2 remain on run queue 208 when scheduling state 110 of thread T2 and context of thread T1 are on core 204, as described in operations 920 and 930 below.

In operation 905, scheduler 205 can determine that a first thread T1 has a first scheduling state 110 and a first context 150. Scheduler 205 can also determine that thread T1 holds a mutex M1 over a resource R1. The scheduler state 110 of thread T1 can indicate that thread T1 has a low priority, such as priority 4. Thread T1 scheduler state 110 may further indicate that thread T1 has a classification corresponding to the low priority, such as background thread.

In operation 910, scheduler 205 can determine that a second thread T2 having a second scheduler state 110 and a second context 150 has a higher priority, such as priority 80. Scheduler can further determine that thread T2 can be waiting on resource R1 held by mutex M1. Mutex M1 is owned by thread T1. In an embodiment, thread T2 can be blocked waiting on mutex M1.

In operation 920, scheduler 205 can maintain scheduling state 110 and context 150 of thread T2 on the run queue. In an embodiment, scheduler state 110 and context 150 of thread T2 can be associated with thread T1 on run queue 208. In an embodiment, scheduling state 110 and thread context 150 of thread T2 can be associated with a pusher list 140 of thread T1. Scheduling state 110 and context 150 of thread T2 may further be associated with mutex M1 held by thread T1.

In operation 930, scheduler 205 can put context 150 thread T1 on core 204 for execution 214 using scheduling state 110 of thread T2. In an embodiment, context 150 of thread T1 can execute using the higher priority of thread T2 and quantum duration 120 of thread T2.

In operation 935, context 150 of thread T1 can be processed by core 204 using scheduling state 110 of thread T2. During processing of context 150 of thread T1, thread T1 can finish using resource R1 and release mutex M1.

In operation 945, scheduler 205 can put context 150 of thread T2 on core 204 for processing using scheduling state 110 of thread T2.

In operation 950, scheduler 205 can put context 150 of thread T1 on core for processing using scheduling state 110 of thread T1.

Figure 9B:
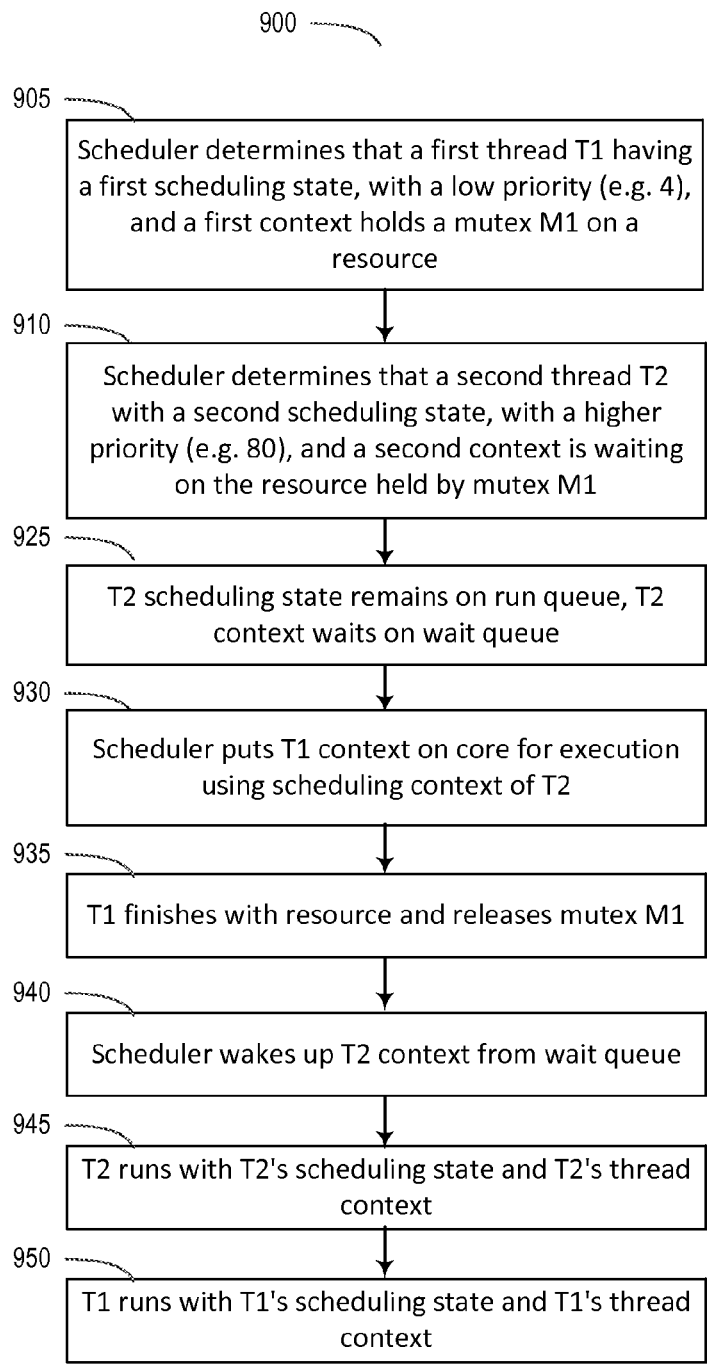

FIG. 9B illustrates, in block diagram form, a flow chart of a method 900 of processing a priority inversion according to some embodiments. In embodiments according to FIG. 9B, when scheduling state 110 of thread T2 and context of thread T1 are on core 204, thread T2 scheduling state 110 can remain on run queue 208 and thread context T2 can be put on wait queue 210, as described in operation 925 below.

In operation 905, scheduler 205 can determined that a first thread T1 has a first scheduling state 110 and a first context 150. Scheduler 205 can also determine that thread T1 holds a mutex M1 over a resource R1. The scheduler state 110 of thread T1 can indicate that thread T1 has a low priority, such as priority 4. Thread T1 scheduler state 110 may further indicate that thread T1 has a classification corresponding to the low priority, such as background thread.

In operation 910, scheduler 205 can determine that a second thread T2 having a second scheduler state 110 and a second context 150 has a high priority, such as priority 80. Thread T2 can be waiting on resource R1 held by mutex M1. Mutex M1 is owned by thread T1. In an embodiment, thread T2 can be blocked waiting on mutex M1.

In operation 925, scheduler 205 can maintain scheduling state 110 of thread T2 on the run queue. Scheduler 205 can put context 150 of thread T2 on wait queue 210. In an embodiment, scheduler state 110 and context 150 of thread T2 can be associated with thread T1 on run queue 208. In an embodiment, scheduling state 110 and thread context 150 of thread T2 can be associated with a pusher list 140 of thread T1. Scheduling state 110 and context 150 of thread T2 may further be associated with mutex M1 held by thread T1.

In operation 930, scheduler 205 can put context 150 thread T1 on core 204 for execution 214 using scheduling state 110 of thread T2. In an embodiment, context 150 of thread T1 can execute using the higher priority of thread T2 and quantum duration 120 of thread T2.

In operation 935, context 150 of thread T1 can be processed by core 204 using scheduling state 110 of thread T2. During processing of context 150 of thread T1, thread T1 can finish using resource R1 and release mutex M1.

In operation 940, scheduler 205 can wake up context 150 of thread T2 from wait queue 210.

In operation 945, scheduler 205 can put context 150 of thread T2 on core 204 for processing using scheduling state 110 of thread T2.

In operation 950, scheduler 205 can put context 150 of thread T1 on core for processing using scheduling state 110 of thread T1.

Figure 10:
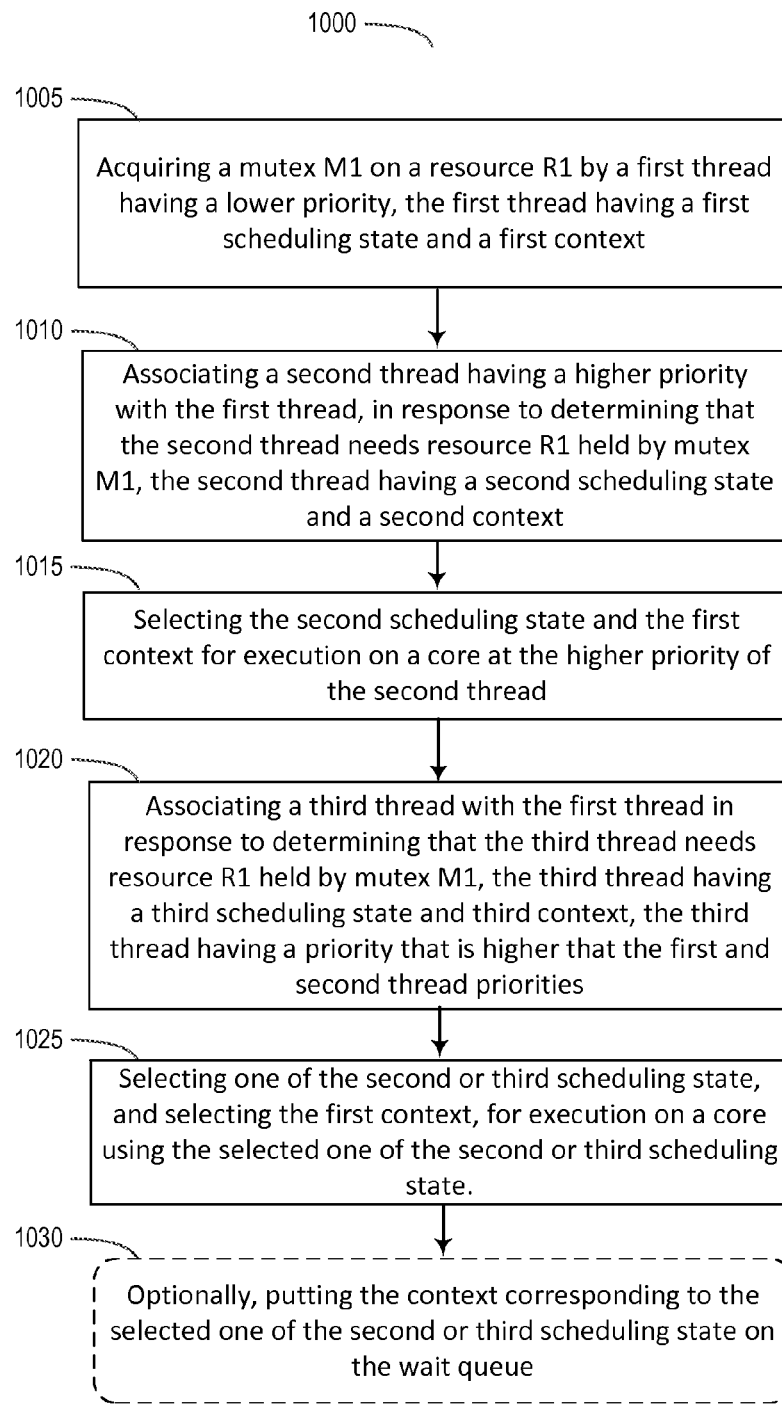
FIG. 10 illustrates, in block diagram form, a flow chart of a method of scheduling a thread for processing using a pusher list of the thread, according to some embodiments.

FIG. 10 illustrates, in block diagram form, a flow chart of method 1000 of scheduling a thread for processing when the thread is on a pusher list 140 of another thread, according to some embodiments.

In operation 1005, a first thread T1 can request a resource R1. First thread T1 can have a first scheduling state 110 and a first context 150. First thread T1 can have a low priority, e.g. 4, according to scheduling state 110 of thread T1. When first thread T1 acquires resource R1, thread T1 can assert a mutex M1 to hold resource R1. Another thread that requests resource R1 can block at mutex M1.

In operation 1010, scheduler 205 can associate a second thread T2 with first thread T1 in response to determining that thread T2 needs resource R1 held by mutex M1. Second thread T2 can have a scheduling state 110 and a context 150. Second thread T2 can have a higher priority, e.g. 80, than thread T1. When thread T2 requests resource R1, thread T2 can block at mutex M1 held by thread T1. A "priority inversion" occurs when higher priority thread, e.g. T2, blocks behind a lower priority thread, e.g. T1. High priority thread T2 is waiting on low priority thread T1.

In operation 1015, scheduler 205 can select context 150 of thread T1 for execution on core 204 using scheduling state 110 of thread T2.

In operation 1020, scheduler 205 can associate a third thread T3 with first thread T1 in response to determining that thread T3 needs resource R1 held by mutex M1. Third thread T3 can have a third scheduling state 110 and third context 150. In an embodiment, third thread T3 can further be associated with mutex M1 held by thread T1 for resource R1. Third scheduling state 110 of thread T3 can have a higher priority that is higher than the priority in first scheduling state 110 of first thread T1. In an embodiment, the association of the second thread T2 and third thread T3 can be ordered, such as an ordered list, queue, or stack. In an embodiment, the order can be by priority of each thread. In another embodiment, the order can be by the order in which a thread requested the resource held by thread T1. Order can be increasing or decreasing by the metric used to determine order.

In operation 1025, scheduler 205 can select one of the second or third scheduling state 110 of threads T2 or T3, respectively. Scheduler 205 can further select context 150 of thread T1 for executing on core 204 using the selected second or third scheduling state 110. The selection by scheduler 205 of the second or third scheduling state 110 can be by an order of the association of threads T2 and T3 with first thread T1 in operation 1020.

In operation 1030, scheduler 205 can optionally put the context 150 corresponding to the selected second or third scheduling state 110 on the wait queue 150.

Figure 11:
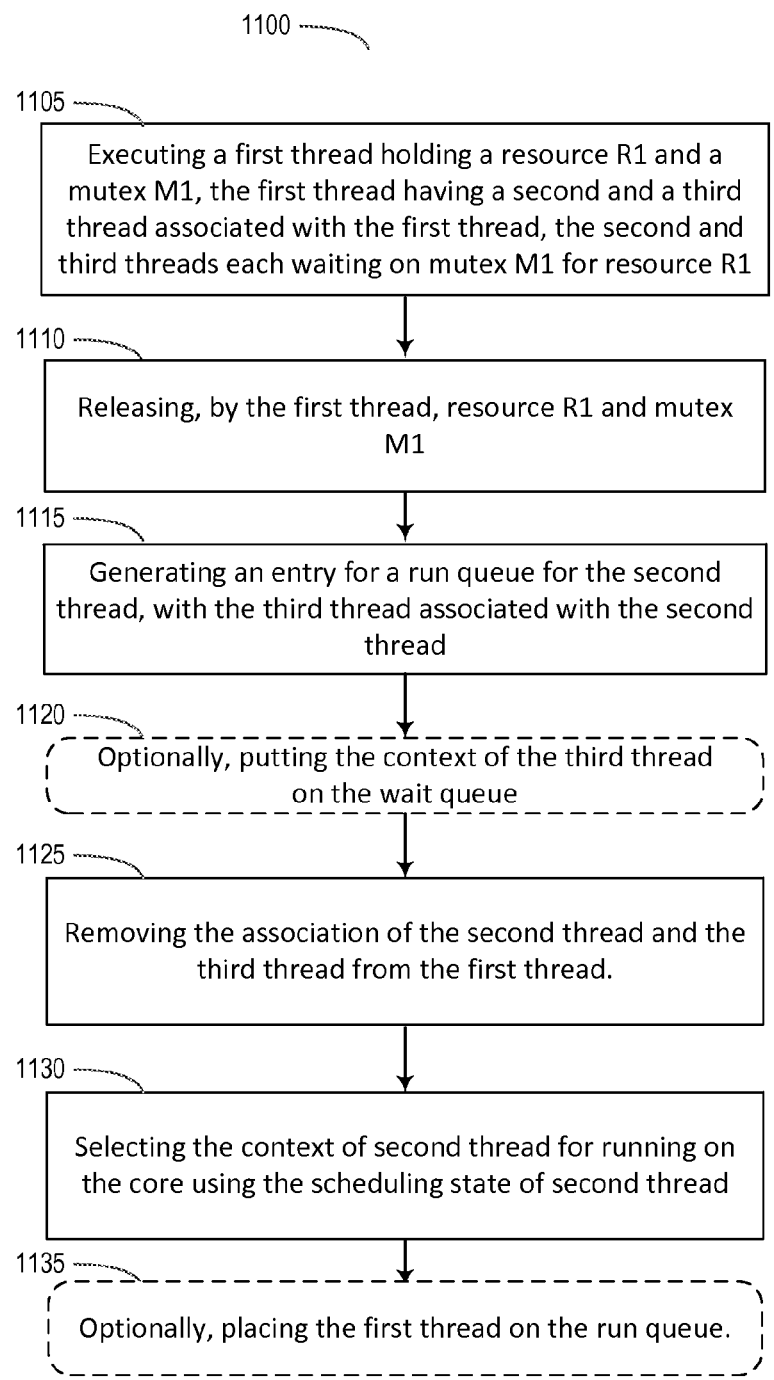
FIG. 11 illustrates, in block diagram form, a flow chart of a method of scheduling a thread for processing a thread using a pusher list of a thread, according to some embodiments.

FIG. 11 illustrates, in block diagram form, a flow chart of a method 1100 of scheduling a thread for processing when the thread is on a pusher list 140 of another thread, according to some embodiments.

In operation 1105, scheduler 205 can cause core 204 to execute 214 a first thread T1. The first thread T1 can hold a resource R1 and a mutex M1 over the resource R1. The first thread T1 can have a second thread T2 and a third thread T3 associated with the first thread T1. The second thread T2 and third thread T3 can each be waiting on resource R1 held by mutex M1. In an embodiment, one or both of threads T2 and T3 can be blocked at mutex M1. The association of the second thread T2 and third thread T3 can be that threads T2 and T3 are on pusher list 140 of thread T1.

In operation 1110, first thread T1 can finish using resource R1 and release mutex M1. Resource R1 is now available for use by another thread, such as threads T2 and T3 that are waiting for resource R1 on pusher list 140 of thread T1. Since thread T1 is no longer holding resource R1, the threads T2 and T3 on pusher list 140 of thread T1 are no longer waiting on thread T1. Thus, one or both of threads T2 and T3 can be made runnable.

In operation 1115, scheduler 205 can select thread T2 or T3 and make one of these threads, e.g. thread T2 runnable and add the unselected, e.g. T3, to pusher list 140 of selected thread T2. In an embodiment, scheduler 205 can select thread T2 and can generate an entry for thread T2 in run queue 208. Thread T2 can likely acquire resource R1 as soon as it is made runnable, both threads T2 and T3 were waiting on resource R1, blocked at mutex M1. When thread T2 acquires resource R1, thread T2 will assert a mutex M2 to hold resource R1. Then, thread T3 will be waiting on mutex M2. Thread T3 can be added to pusher list 140 of thread T2 on run queue 208. Thread T3 can be further associated with mutex M2 held by thread T2.

In operation 1120, schedule 205 can optionally put context 150 of thread T3 on wait queue 210. In an embodiment, pusher list 140 of thread T2 can contain scheduling state 110 of thread T3.

In operation 1125, scheduler 205 can remove the association of threads T2 and T3 from thread T1.

In operation 1130, scheduler 205 can select context 150 of thread T2 for execution on core 204 using scheduling state 110 of thread T2.

In operation 1135, scheduler 205 can optionally place thread T1 on the run queue 208.

Figure 12:
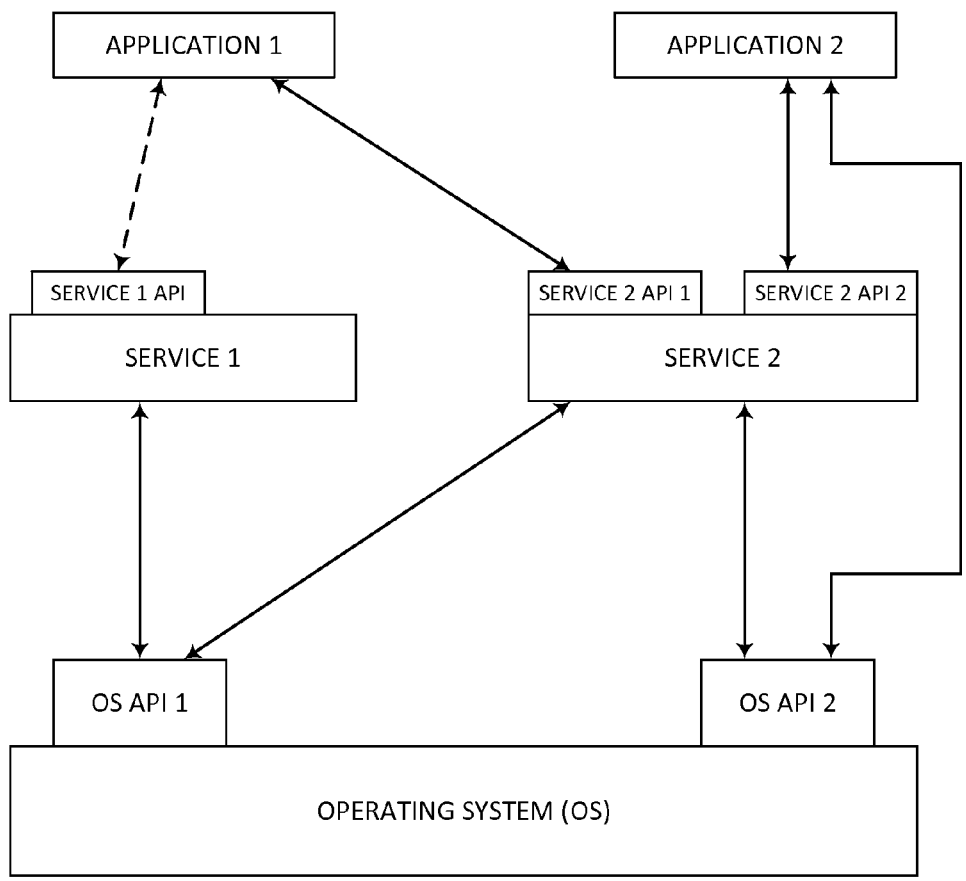
FIG. 12 illustrates an exemplary embodiment of a software stack usable in some embodiments of the invention.

In FIG. 12 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 13:
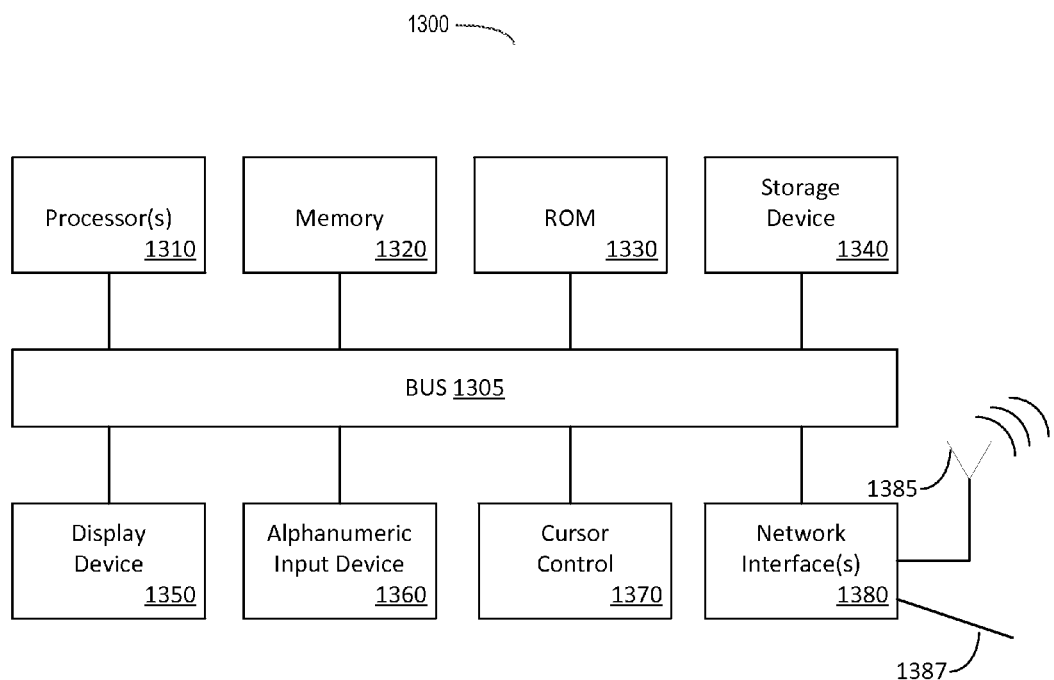
FIG. 13 is a block diagram of one embodiment of a computing system.

FIG. 13 is a block diagram of one embodiment of a computing system 1300. The computing system illustrated in FIG. 13 is intended to represent a range of computing systems (either wired or wireless) including, for example, desktop computer systems, laptop computer systems, cellular telephones, tablet computers, personal digital assistants (PDAs) including cellular-enabled PDAs, set top boxes, entertainment systems or other consumer electronic devices. Cellular telephones can include SmartPhones, such as Apple's iPhone®. Tablet computers can include, e.g., Apple's iPad® or Microsoft's Surface®. Alternative computing systems may include more, fewer and/or different components. The computing system of FIG. 13 may be used to provide the client device and/or the server device.

Computing system 1300 includes bus 1305 or other communication device to communicate information, and processor 1310 coupled to bus 1305 that may process information.

While computing system 1300 is illustrated with a single processor, computing system 1300 may include multiple processors and/or co-processors 1310. Computing system 1300 further may include random access memory (RAM) or other dynamic storage device 1320 (referred to as main memory), coupled to bus 1305 and may store information and instructions that may be executed by processor(s) 1310. Main memory 1320 may also be used to store temporary variables or other intermediate information during execution of instructions by processor 1310.

Computing system 1300 may also include read only memory (ROM) 1330 and/or other static storage device 1340 coupled to bus 1305 that may store static information and instructions for processor(s) 1310. Data storage device 1340 may be coupled to bus 1305 to store information and instructions. Data storage device 1340 such as flash memory or a magnetic disk or optical disc and corresponding drive may be coupled to computing system 1300.

Computing system 1300 may also be coupled via bus 1305 to display device 1350, such as a cathode ray tube (CRT) or liquid crystal display (LCD), to display information to a user. Computing system 1300 can also include an alphanumeric input device 1360, including alphanumeric and other keys, which may be coupled to bus 1305 to communicate information and command selections to processor(s) 1310. Another type of user input device is cursor control 1370, such as a touchpad, a mouse, a trackball, or cursor direction keys to communicate direction information and command selections to processor(s) 1310 and to control cursor movement on display 1350.

Computing system 1300 further may include one or more network interface(s) 1380 to provide access to a network, such as a local area network. Network interface(s) 1380 may include, for example, a wireless network interface having antenna 1385, which may represent one or more antenna(e). Computing system 1300 can include multiple wireless network interfaces such as a combination of WiFi, Bluetooth and cellular telephony interfaces. Network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, network interface(s) 1380 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method, comprising:
   detecting that a first thread holds a mutex on a resource, the first thread having a first scheduling state that includes a first processing priority and at least one additional scheduling state attribute, and the first thread having a first processing context that includes a state of one or more registers associated with the first thread;
   during processing of a second thread, by a processor core of a processing system, detecting that the second thread is blocked, waiting on the release of the mutex on the resource, the second thread having a second scheduling state that includes a second processing priority and at least one additional scheduling state attribute, and a second processing context that includes a state of one or more registers associated with the second thread, wherein the second processing priority is higher than the first processing priority;
   keeping the second scheduling state of the second thread on the processor core;
   context switching the first processing context of the first thread onto the processor core;
   processing, by the processor core, the first processing context using the second scheduling state of the second thread;
   after releasing, by the first thread, the mutex on the resource, context switching the first processing context from the processor core back to the first thread.

2. The method of claim 1, further comprising:
   after detecting that the second thread is blocked waiting on the mutex held by the first thread, adding a reference to the scheduling state of the second thread to a list of one or more threads that are waiting on the release of the mutex held by the first thread, the list stored in the run queue in association with the first thread.

3. The method of claim 2, further comprising:
   detecting that a third thread having a higher priority than the first thread is blocked waiting on the mutex held by the first thread;
   adding a reference to a scheduling state of the third thread to the list of one or more threads that are waiting on the mutex held by the first thread, the list stored in the run queue in association with the first thread.

4. The method of claim 2, further comprising:
   removing a reference to the second thread from the list of one or more threads stored in the run queue in association with the first thread, in response to detecting that the first thread has released the mutex on the resource; and processing the second thread using the second processing context and the second scheduling state.

5. The method of claim 1, wherein each context switch is a direct context switch that does not require a scheduler to make a scheduling decision as to which thread to run next.

6. The method of claim 1, wherein the first and second scheduling states each include a processing quantum of time, and the first scheduling state processing quantum of time differs from the second scheduling state processing quantum of time.

7. The method of claim 1, wherein the second thread resides in the run queue while it is blocked waiting on the first thread to release the mutex on the resource.

8. A non-transitory computer-readable medium programmed with instructions that, when executed by a processing system, perform a method, comprising:

detecting that a first thread holds a mutex on a resource, the first thread having a first scheduling state that includes a first processing priority and at least one additional scheduling state attribute, and the first thread having a first processing context that includes a state of one or more registers associated with the first thread;

during processing of a second thread by a processor core of the processing system, detecting that the second thread is blocked, waiting on the release of the mutex on the resource, the second thread having a second scheduling state that includes a second processing priority and at least one additional scheduling state attribute, and a second processing context that includes a state of one or more registers associated with the second thread, wherein the second processing priority is higher than the first processing priority;

keeping the second scheduling state of the second thread on the processor core;

context switching the first processing context of the first thread onto the processor core;

processing, by the processor core, the first processing context using the scheduling state of the second thread;

after releasing, by the first thread, the mutex on the resource, context switching the first processing context from the processor core back to the first thread.

9. The medium of claim 8, further comprising:

after detecting that the second thread is blocked waiting on the mutex held by the first thread, adding a reference to the scheduling state of the second thread to a list of one or more threads that are waiting on the release of the mutex held by the first thread, the list stored in the run queue in association with the first thread.

10. The medium of claim 9, further comprising:

detecting that a third thread having a higher priority than the first thread is blocked waiting on the mutex held by the first thread;

adding a reference to a scheduling state of the third thread to the list of one or more threads that are waiting on the mutex held by the first thread, the list stored in the run queue in association with the first thread.

11. The medium of claim 9, further comprising:

removing a reference to the second thread from the list of one or more threads stored in the run queue in association with the first thread, in response to detecting that the first thread has released the mutex on the resource; and processing the second thread using the second processing context and the second scheduling state.

12. The medium of claim 8, wherein each context switch is a direct context switch that does not require a scheduler to a make a scheduling decision as to which thread to run next.

13. The medium of claim 8, wherein the first and second scheduling states each include a processing quantum of time, and the first scheduling state processing quantum of time differs from the second scheduling state processing quantum of time.

14. The medium of claim 8, wherein the second thread resides in the run queue while it is blocked waiting on the first thread to release the mutex on the resource.

15. A processing system comprising:

one or more processors coupled to a memory, the memory programmed with executable instructions that, when executed by the one or more processors perform a method, comprising:

detecting that a first thread holds a mutex on a resource, the first thread having a first scheduling state that includes a first processing priority and at least one additional scheduling state attribute, and the first thread having a first processing context that includes a state of one or more registers associated with the first thread;

during processing of a second thread by a processor core of a processing system, detecting that the second thread is blocked, waiting on the release of the mutex on the resource, the second thread having a second scheduling state that includes a second processing priority and at least one additional scheduling state attribute, and a second processing context that includes a state of one or more registers associated with the second thread, wherein the second processing priority is higher than the first processing priority;

keeping the second scheduling state of the second thread on the processor core;

context switching the first processing context of the first thread onto the processor core;

processing, by the processing core, the first processing context of the first thread using the second scheduling state of the second thread;

after releasing, by the first thread, the mutex on the resource, context switching the first processing context from the processor core back to the first thread.

16. The system of claim 15, further comprising:

after detecting that the second thread is blocked waiting on a mutex held by the first thread, adding a reference to the scheduling state of the second thread to a list of one or more threads that are waiting on the release of the mutex held by the first thread, the list stored in the run queue in association with the first thread.

17. The system of claim 16, further comprising:

detecting that a third thread having a higher priority than the first thread is blocked waiting on the mutex held by the first thread;

adding a reference to the scheduling state of the third thread to the list of one or more threads that are waiting on the mutex held by the first thread, the list stored in the run queue in association with the first thread.

18. The system of claim 16, further comprising:

removing a reference to the second thread from the list of one or more threads stored in the run queue in association with the first thread, in response to detecting that the first thread has released the mutex on the resource; and processing the second thread using the second processing context and the second scheduling state.

19. The system of claim 15, wherein each context switch is a direct context switch that does not require a scheduler to make a scheduling decision as to which thread to run next.

20. The system of claim 15, wherein the first and second scheduling states each include a processing quantum of time, and the first scheduling state processing quantum of time differs from the second scheduling state processing quantum of time.

21. The system of claim 15, wherein the second thread resides in the run queue while it is blocked waiting on the first thread to release the mutex on the resource.

22. The method of claim 1, wherein the first and second scheduling states each further comprise a scheduler decay.

23. The method of claim 1 wherein the first and second scheduling states each comprise a scheduling classification.

24. The method of claim 1, wherein the first scheduling state further comprises a push-list of tasks that are waiting on the mutex held by the first thread.

25. The method of claim 1, further comprising:
   after releasing, by the first thread, the mutex on the resource, and in response to determining that there is processing time remaining in the current quantum of the second processing state:
      keeping the second scheduling state of the second thread on the processor core;
      context switching the second processing context of the second thread onto the processor core; and
      processing the second scheduling context of the second thread using the second scheduling state of the second thread until the current quantum of the second processing state ends.

* * * * *